(12) United States Patent
Hwang et al.

(10) Patent No.: US 11,825,452 B2
(45) Date of Patent: Nov. 21, 2023

(54) METHOD AND DEVICE FOR DETERMINING FEEDBACK RESOURCE IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/981,909

(22) Filed: Nov. 7, 2022

(65) Prior Publication Data

US 2023/0069396 A1    Mar. 2, 2023

Related U.S. Application Data

(63) Continuation of application No. 17/572,035, filed on Jan. 10, 2022, now Pat. No. 11,496,995, which is a continuation of application No. PCT/KR2020/008063, filed on Jun. 22, 2020.

(Continued)

(30) Foreign Application Priority Data

Jul. 10, 2019   (KR) .................. 10-2019-0083374
Jul. 10, 2019   (KR) .................. 10-2019-0083454

(51) Int. Cl.
*H04W 72/02*      (2009.01)
*H04L 1/1812*     (2023.01)
(Continued)

(52) U.S. Cl.
CPC .......... *H04W 72/02* (2013.01); *H04L 1/1812* (2013.01); *H04L 5/0053* (2013.01); *H04W 4/40* (2018.02);
(Continued)

(58) Field of Classification Search
CPC ........ H04W 72/02; H04W 4/40; H04W 4/46; H04W 72/0446; H04W 4/0446; H04L 5/0053; H04L 5/0453
See application file for complete search history.

(56) References Cited

U.S. PATENT DOCUMENTS 11,496,995 B2 *   11/2022   Hwang .................. H04L 5/0055
2018/0116007 A1*   4/2018   Yasukawa ......... H04W 72/1263
(Continued)

FOREIGN PATENT DOCUMENTS

WO     WO2015152581      10/2015

OTHER PUBLICATIONS

Extended European Search Report in European Application No. 20837514.7, dated Jun. 22, 2022, 6 pages.
(Continued)

*Primary Examiner* — Raj Jain
(74) *Attorney, Agent, or Firm* — Fish & Richardson P.C.

(57) ABSTRACT

A method for performing wireless communication by a first device and a device for supporting same are provided. The method may comprise the steps of: receiving a physical sidelink shared channel (PSSCH) from a second device; determining a physical sidelink feedback channel (PSFCH) resource associated with the PSSCH; and transmitting hybrid automatic repeat request (HARQ) feedback to the second device on the PSFCH resource. Here, the PSFCH resource can be determined on the basis of a sub channel associated with the PSSCH, a slot associated with the PSSCH, a cast type of communication between the first device and the second device, an ID of the first device, and a source ID of the second device.

17 Claims, 32 Drawing Sheets

Related U.S. Application Data

(60) Provisional application No. 62/937,168, filed on Nov. 18, 2019, provisional application No. 62/895,947, filed on Sep. 4, 2019.

(51) Int. Cl.

| | | |
|---|---|---|
| *H04L 5/00* | (2006.01) | |
| *H04W 72/0446* | (2023.01) | |
| *H04W 4/40* | (2018.01) | |
| *H04W 4/46* | (2018.01) | |
| *H04W 72/20* | (2023.01) | |

(52) U.S. Cl.
CPC ......... *H04W 4/46* (2018.02); *H04W 72/0446* (2013.01); *H04W 72/20* (2023.01)

(56) References Cited

U.S. PATENT DOCUMENTS

| | | | | |
|---|---|---|---|---|
| 2020/0351033 A1* | 11/2020 | Ryu | ................. | H04W 72/0453 |
| 2021/0266110 A1 | 8/2021 | Wang et al. | | |
| 2021/0306824 A1* | 9/2021 | Li | ........................ | H04L 1/1819 |
| 2021/0345313 A1 | 11/2021 | Mallick et al. | | |
| 2021/0400681 A1* | 12/2021 | Wang | .................... | H04L 5/0044 |
| 2022/0232520 A1* | 7/2022 | Yoshioka | .......... | H04W 72/0453 |

OTHER PUBLICATIONS

Huawei & HiSilicon, "A V2X group member discovery for groupcast communication," S2-1907629 (Revision of S2-190xxxx), Presented at 3GPP TSG-SA WG2 Meeting #134, Jun. 24-Jun. 28, 2019, Sapporo, Japan, 8 pages.

Huawei et al., "Design and contents of PSCCH and PSFCH," 3GPP TSG RAN WG1 Ad-Hoc Meeting 1901, R1-1900858, Taipei, Jan. 21-25, 2019, 9 pages.

InterDigital Inc., "On Physical Layer Structure for NR V2X Sidelink," R1-1905400, Presented at 3GPP TSG RAN WG1 #96bis, Xi'an, China, Apr. 8-12, 2019, 12 pages.

LG Electronics, "Feature lead summary for agenda item 7.2.4.5 Physical layer procedures for sidelink," 3GPP TSG RAN WG1 #97, R1-1907682, Reno, USA, May 13-17, 2019, 26 pages.

Nokia & Nokia Shanghai Bell, "Discussion of physical layer structure for sidelink," R1-1906074, Presented at 3GPP TSG RAN WG1 #97, Reno, USA, May 13-17, 2019, 16 pages.

Xiaomi Communications, "On HARQ operation for 5G V2x communications," R1-1906574, Presented at 3GPP TSG RAN WG1 #97, Reno, USA, May 13-17, 2019, 3 pages.

Huawei, HiSilicon, "Sidelink Physical Layer Structure for NR V 2X," 3GPP TSG RAN WG1 Meeting #97 R1-1906007, 3GPP, May 3, 2019, 20 pages.

Huawei, HiSilicon, "Sidelink Physical Layer Procedures for NR V 2X," 3GPP TSG RAN WG1 Meeting #96B R1-1903944, 3GPP, Apr. 2, 2019, 19 pages.

Huawei, HiSilicon, "Discussion on Physical Layer Procedures for NR Sidelink," 3GPP TSG RAN WG! Meeting #97, R1-1907018, 3GPP, Jun. 18, 2019, 11 pages.

Japanese Office Action in JP Appln. No. 2022-500702, dated Dec. 6, 2022, 8 pages (with English translation).

Korean Office Action in KR Appln. No. 10-2022-7000383, dated Jan. 10, 2023, 10 pages (with English translation).

\* cited by examiner

FIG. 4
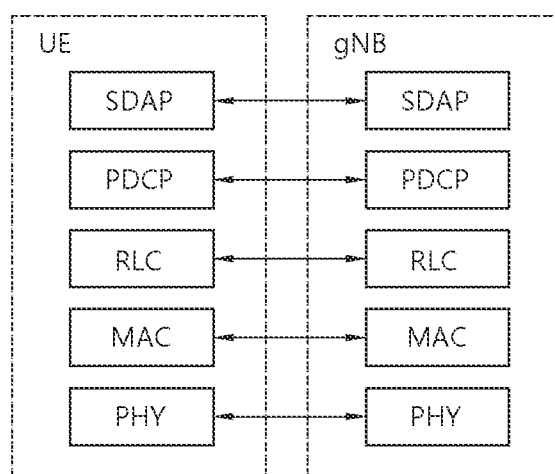
(a)
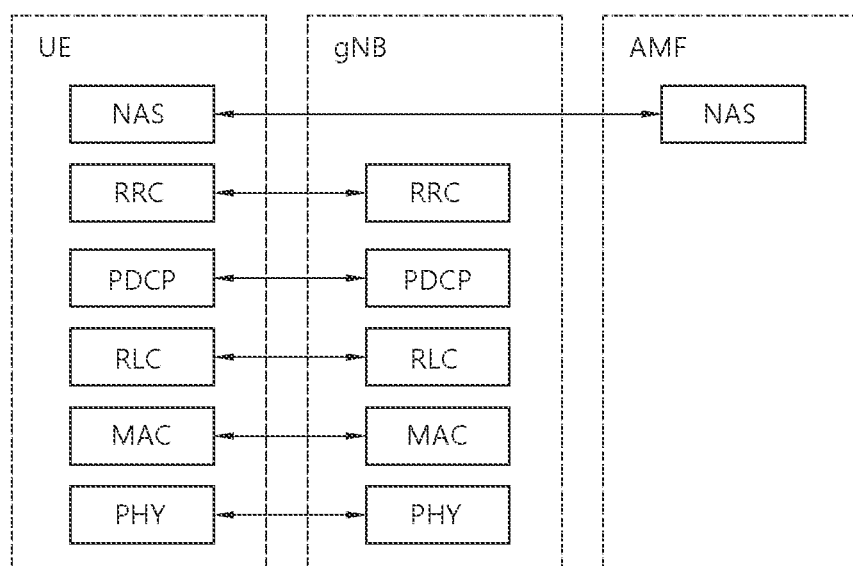
(b)

FIG. 8
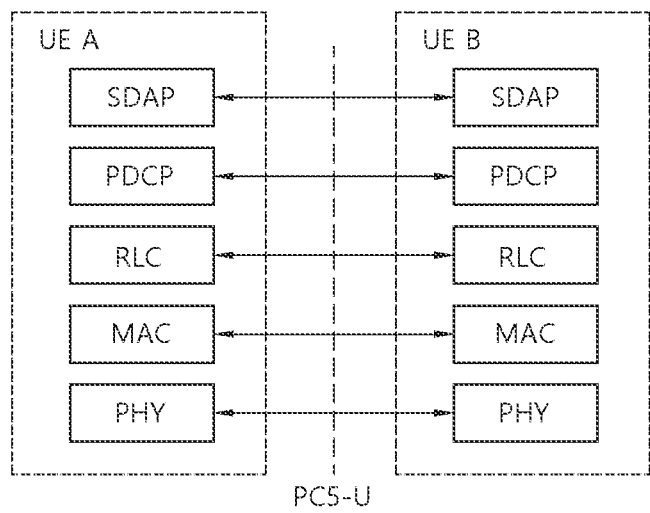
(a)
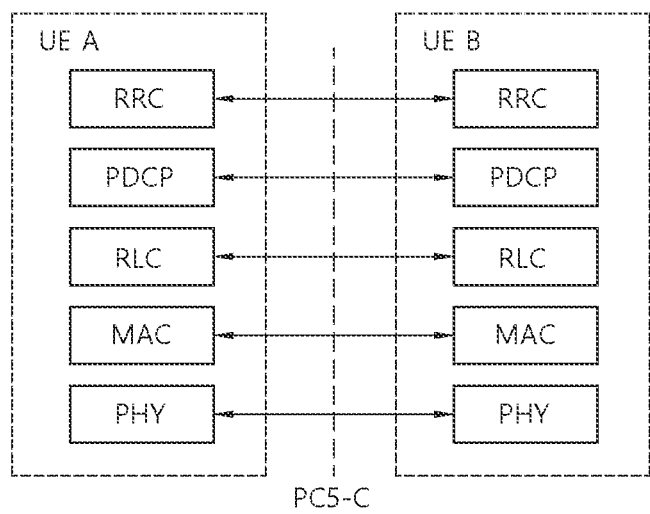
(b)

METHOD AND DEVICE FOR DETERMINING FEEDBACK RESOURCE IN NR V2X

CROSS-REFERENCE TO RELATED APPLICATIONS

This application is a continuation of U.S. application Ser. No. 17/572,035, filed on Jan. 10, 2022, which is a continuation pursuant to 35 U.S.C. § 119(e) of International Application PCT/KR2020/008063, with an international filing date of Jun. 22, 2020, which claims the benefit of Korean Patent Application No. 10-2019-0083374, filed on Jul. 10, 2019, Korean Patent Application No. 10-2019-0083454, filed on Jul. 10, 2019, U.S. Provisional Patent Application No. 62/895,947, filed on Sep. 4, 2019 and U.S. Provisional Patent Application No. 62/937,168, filed on Nov. 18, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, a UE which has transmitted a PSSCH may receive a PSFCH related to the PSSCH. Therefore, the UE needs to efficiently determine a resource for the PSFCH.

Technical Solutions

In one embodiment, a method for performing, by a first device, wireless communication is provided. The method may comprise: receiving, from a second device, a physical sidelink shared channel (PSSCH); determining a physical sidelink feedback channel (PSFCH) resource related to the PSSCH; and transmitting, to the second device, a hybrid automatic repeat request (HARQ) feedback based on the PSFCH resource. Herein, the PSFCH resource may be determined based on a sub-channel related to the PSSCH, a slot related to the PSSCH, a cast type of communication between the first device and the second device, an ID of the first device, and a source ID of the second device.

In one embodiment, a first device configured to perform wireless communication is provided. The first device may comprise: one or more memories storing instructions; one or more transceivers; and one or more processors connected to the one or more memories and the one or more transceiver. The one or more processors may execute the instructions to: receive, from a second device, a physical sidelink shared channel (PSSCH); determine a physical sidelink feedback channel (PSFCH) resource related to the PSSCH; and transmit, to the second device, a hybrid automatic repeat request (HARQ) feedback based on the PSFCH resource. Herein, the PSFCH resource may be determined based on a sub-channel related to the PSSCH, a slot related to the PSSCH, a cast type of communication between the first device and the second device, an ID of the first device, and a source ID of the second device.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
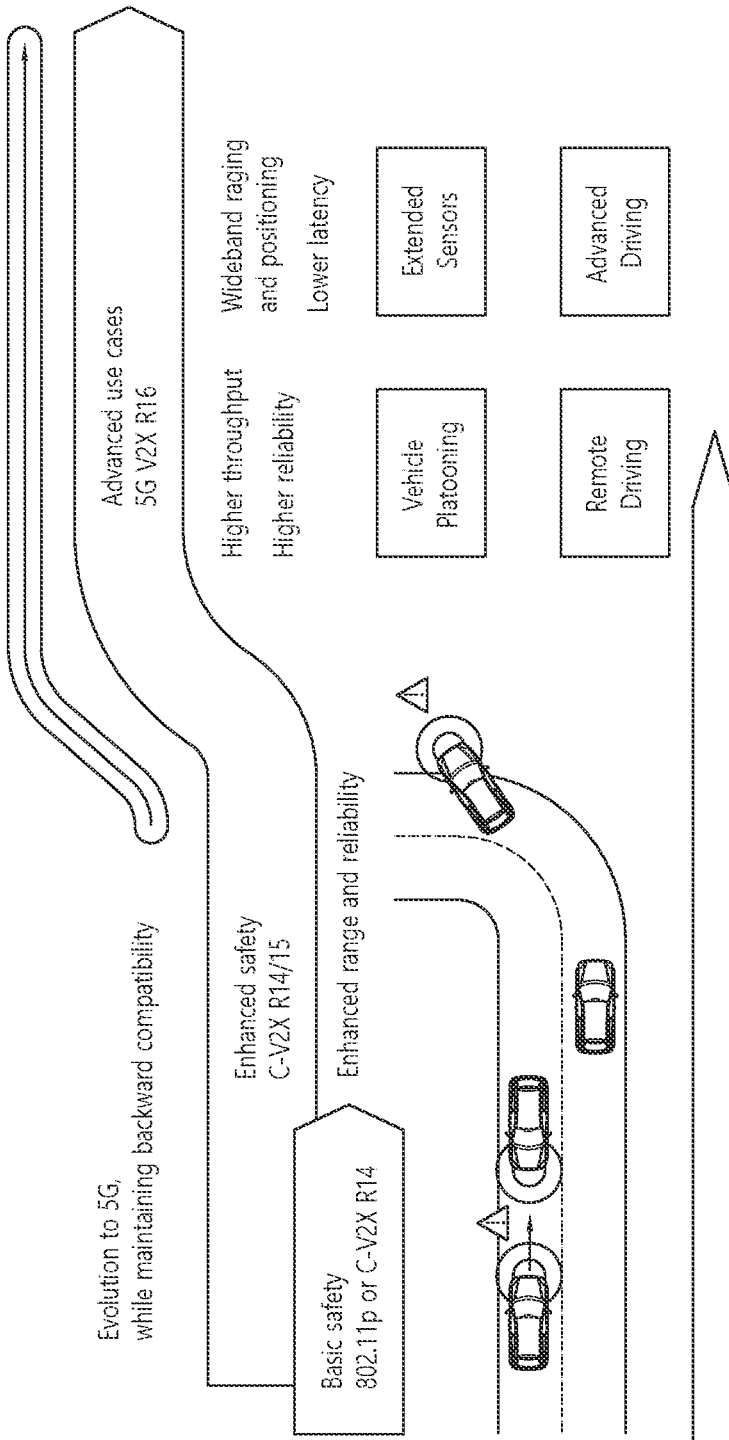
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A". "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
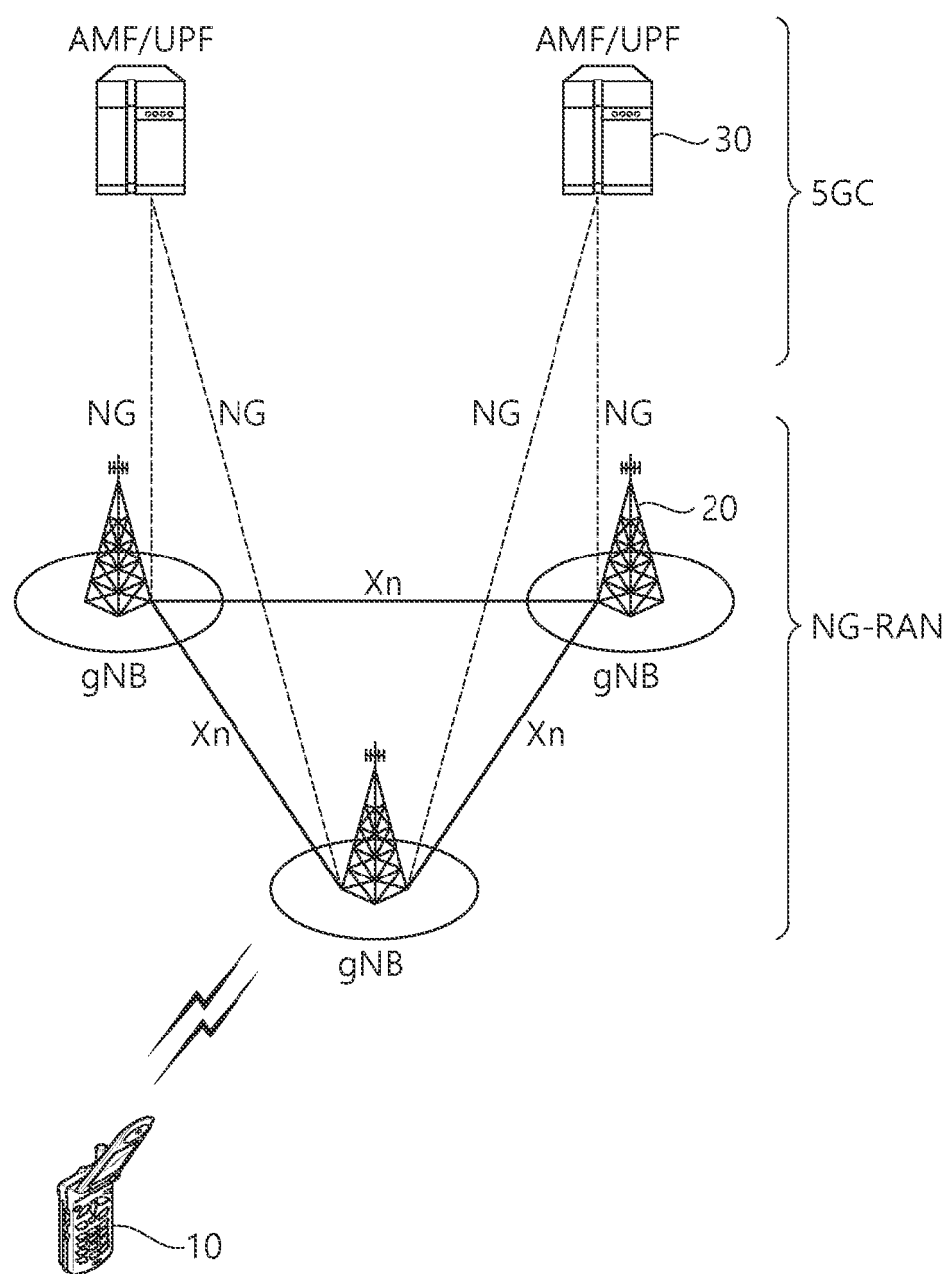
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
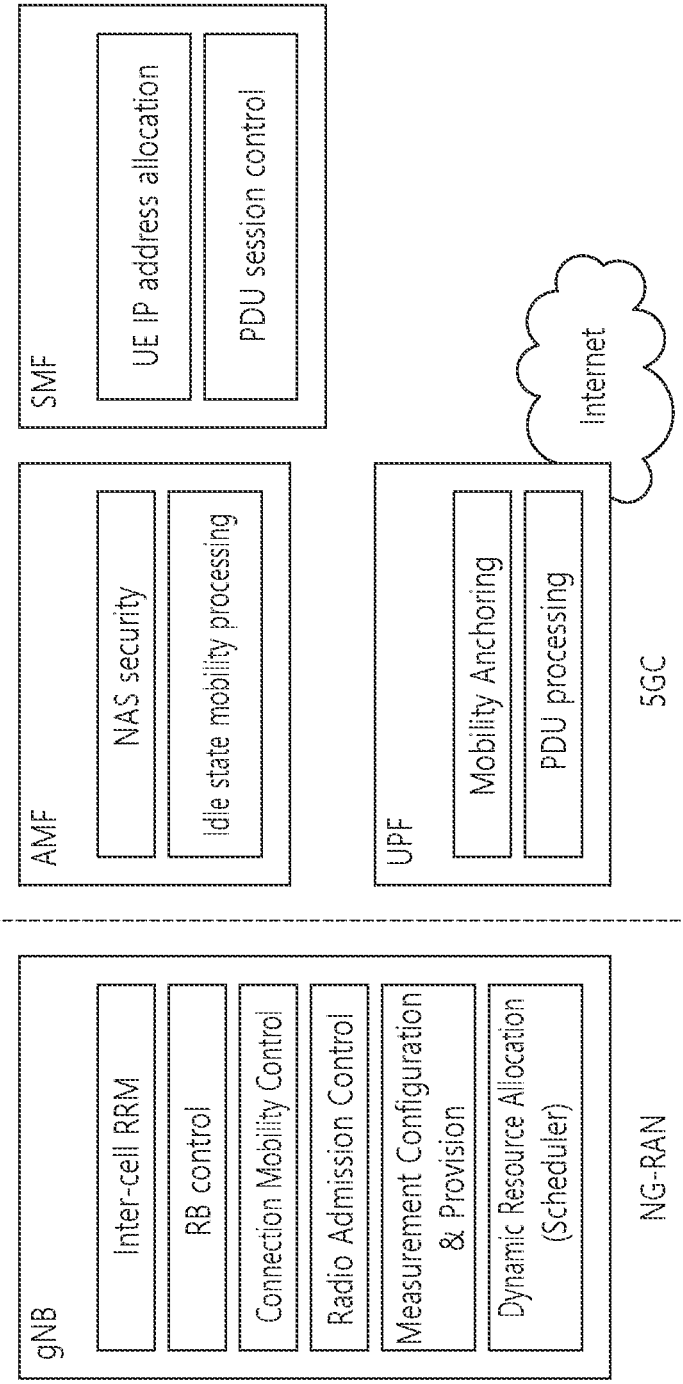
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
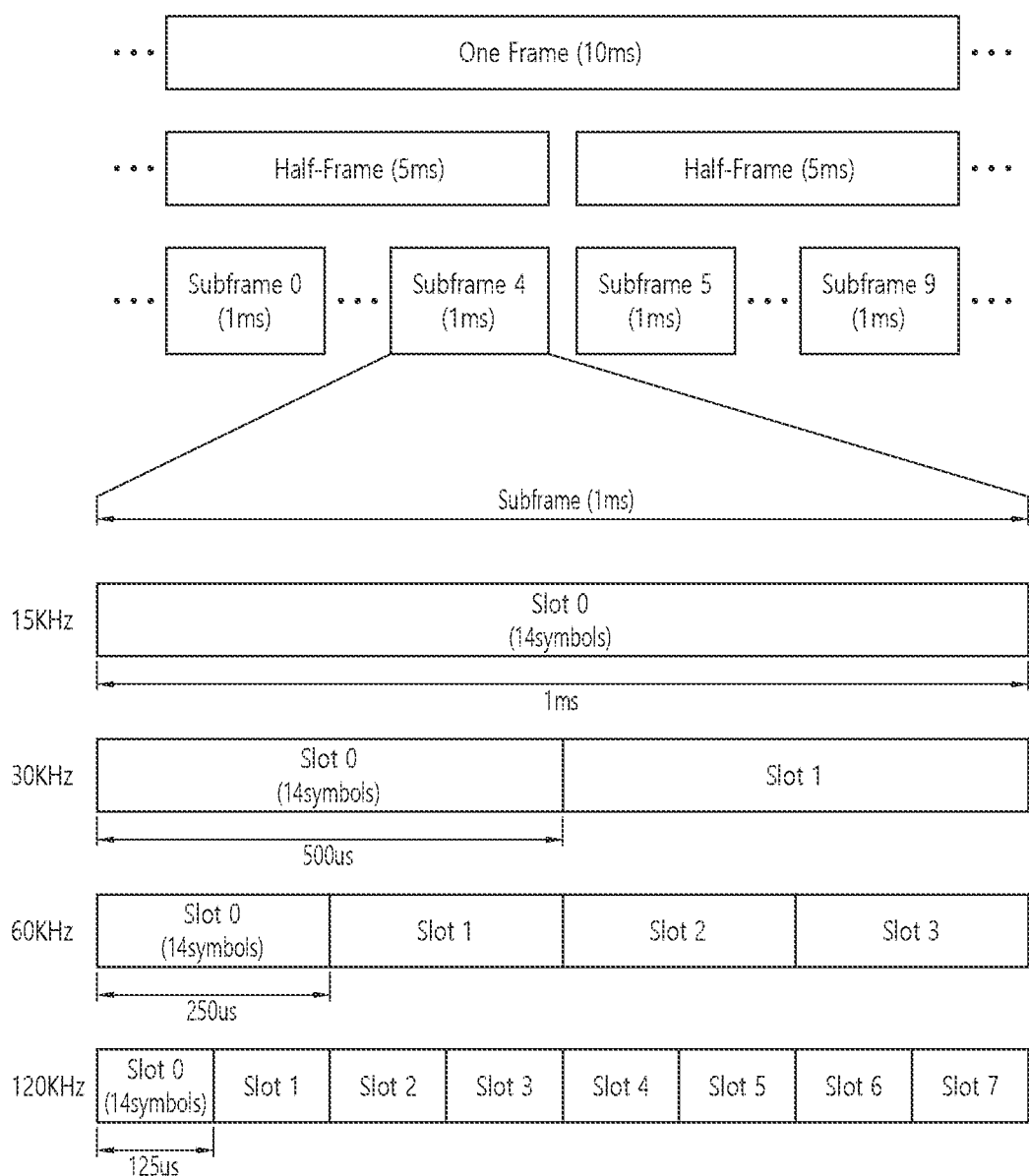
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHZ | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHZ | 15, 30, 60 kHz |
| FR2 | 24250 MHz-52600 MHz | 60, 120, 240 kHz |

Figure 6:
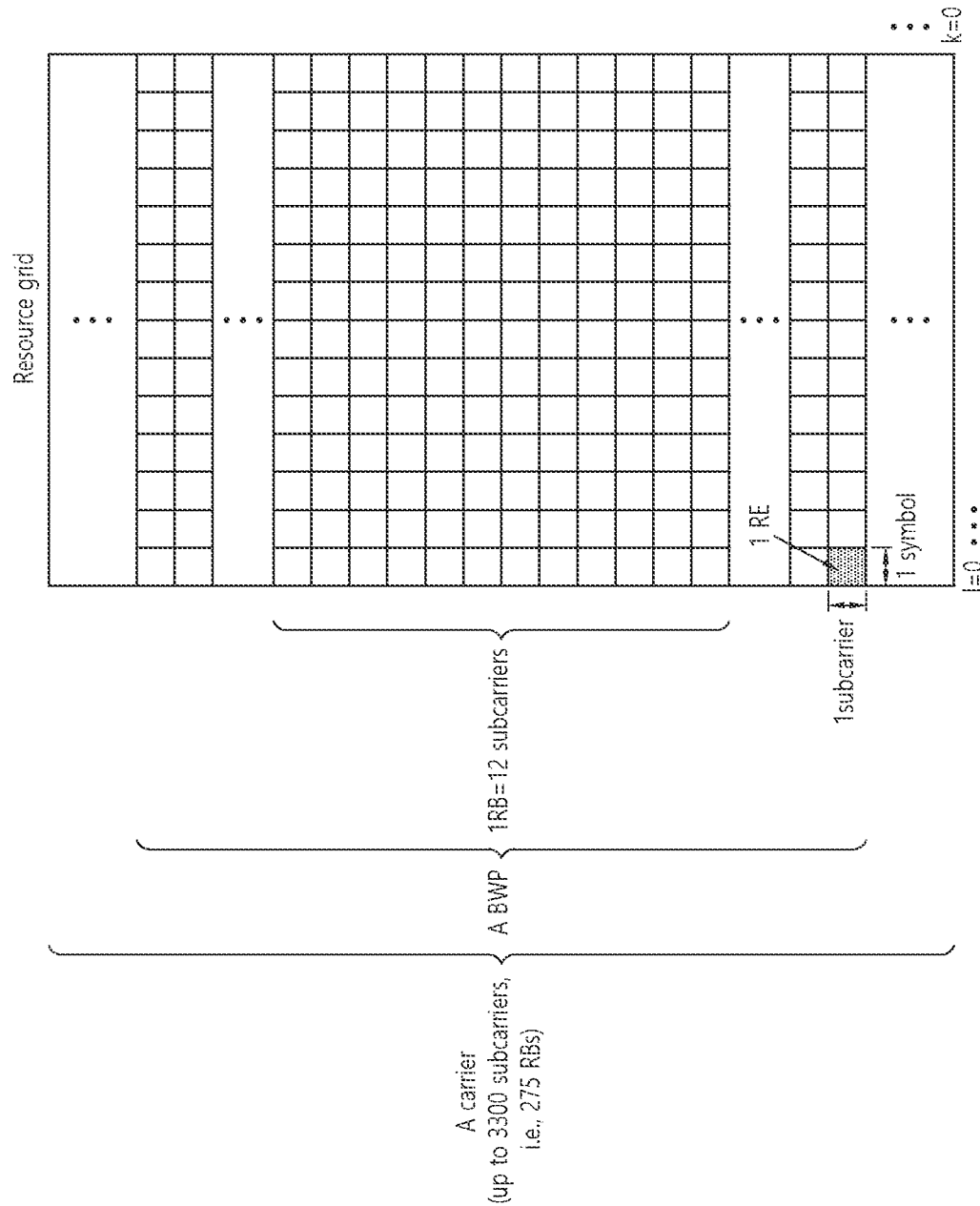
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
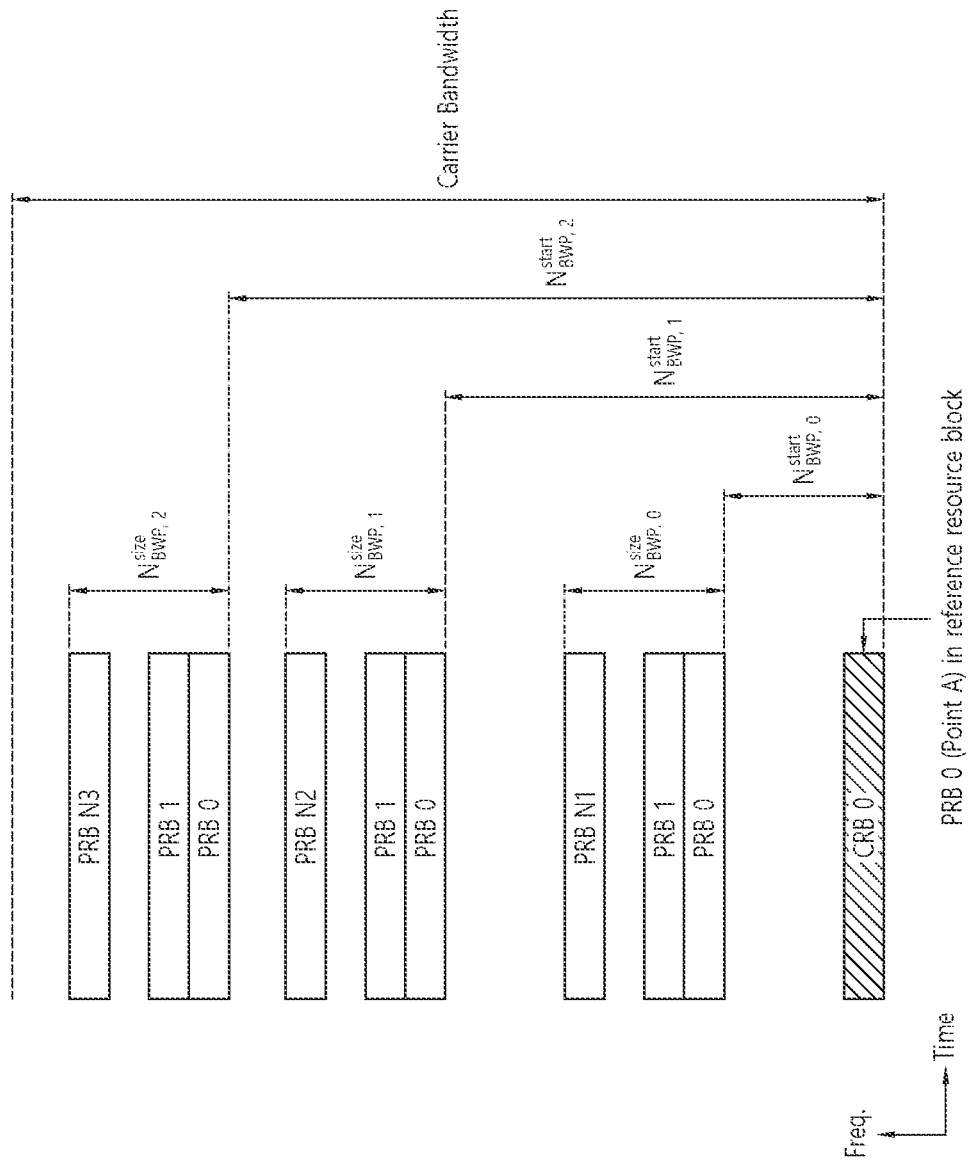
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
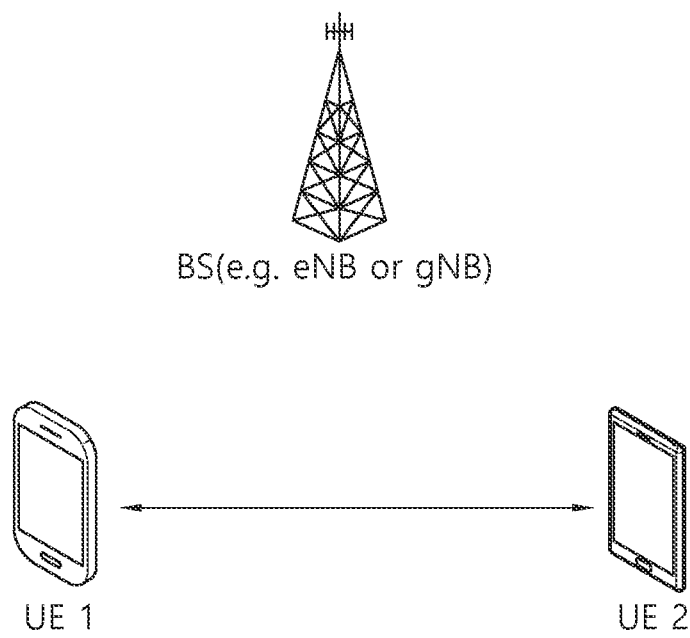
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
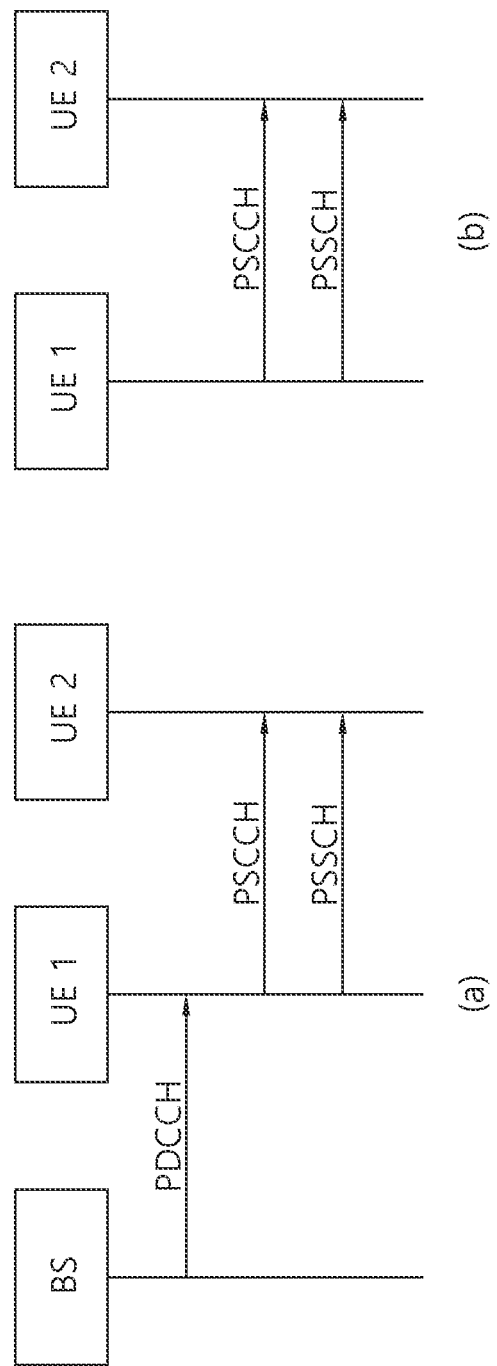
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example. FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
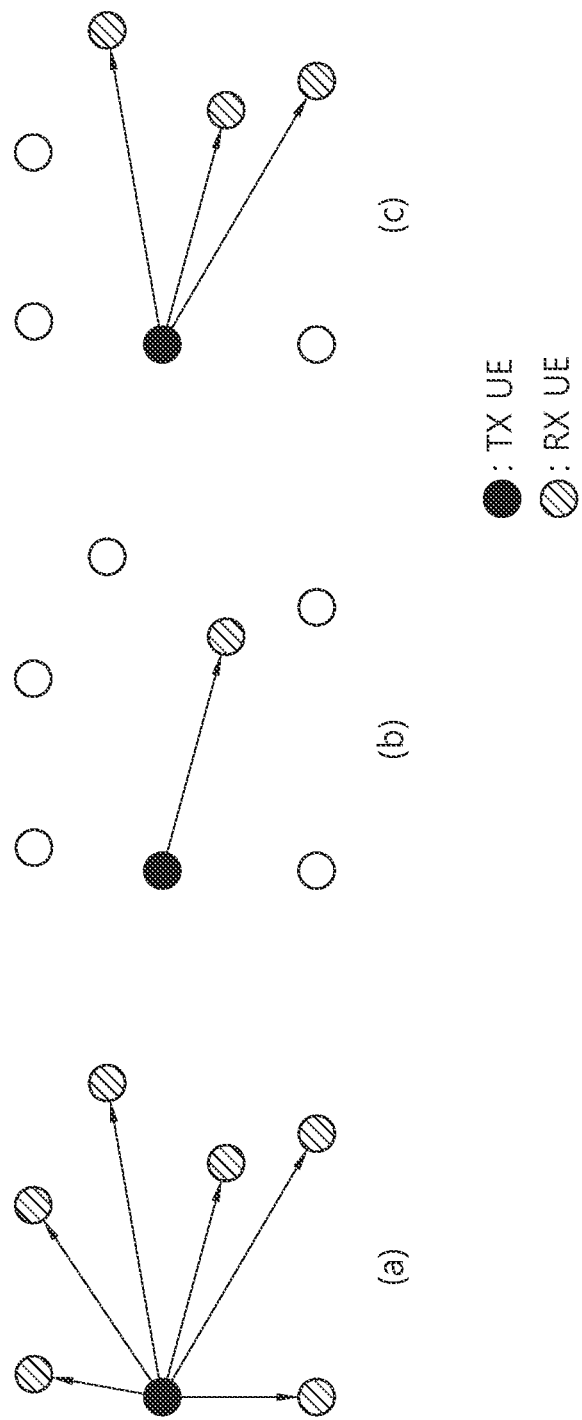
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically. FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.
  (1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.
  (2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, if the groupcast option 1 is used for sidelink groupcast transmission, a plurality of receiving UEs (e.g., all receiving UEs or some receiving UEs in a group) may share a PSFCH resource to transmit HARQ feedback. On the other hand, if the groupcast option 2 is used for sidelink groupcast transmission, a plurality of receiving UEs (e.g., each receiving UE in a group) may transmit HARQ ACK or HARQ NACK by using separate PSFCH resources. For example, each of PSFCH resources may be mapped to a time domain resource, a frequency domain resource, and a code domain resource.

Meanwhile, all or a part of resources through which a plurality of PSSCHs are transmitted may overlap. For example, resources through which a plurality of PSSCHs are transmitted may completely or partially overlap each other on a frequency domain. For example, resources through which a plurality of PSSCHs are transmitted may completely or partially overlap each other on a time domain. For example, resources through which a plurality of PSSCHs are transmitted may completely or partially overlap each other on a code domain. If all or a part of resources for transmitting a plurality of PSSCHs overlap, PSFCH resources for each PSSCH may need to be distinguished.

Meanwhile, PSSCHs transmitted through different resources may correspond to different transmitting UEs and/or receiving UEs. and PSFCH transmissions corresponding thereto may also occur from different UEs. For example, different transmitting UEs may transmit PSSCHs through different resources, and different transmitting UEs may receive PSFCHs corresponding to the PSSCHs from different UEs. In the above case, in general, transmit power of the PSFCHs may be different. Therefore, if a plurality of PSFCH resources are multiplexed in a code domain (i.e., code-domain multiplexing (CDM)), a problem (hereinafter, a near-far problem) in which the UE cannot detect a specific PSFCH signal may occur due to a large difference in receive power at the PSFCH receiving end. For example, the case in which a plurality of PSFCH resources are multiplexed in the code domain may mean a case in which a plurality of PSFCH resources overlapping in time and frequency resources are transmitted by using different codes.

Figure 12:
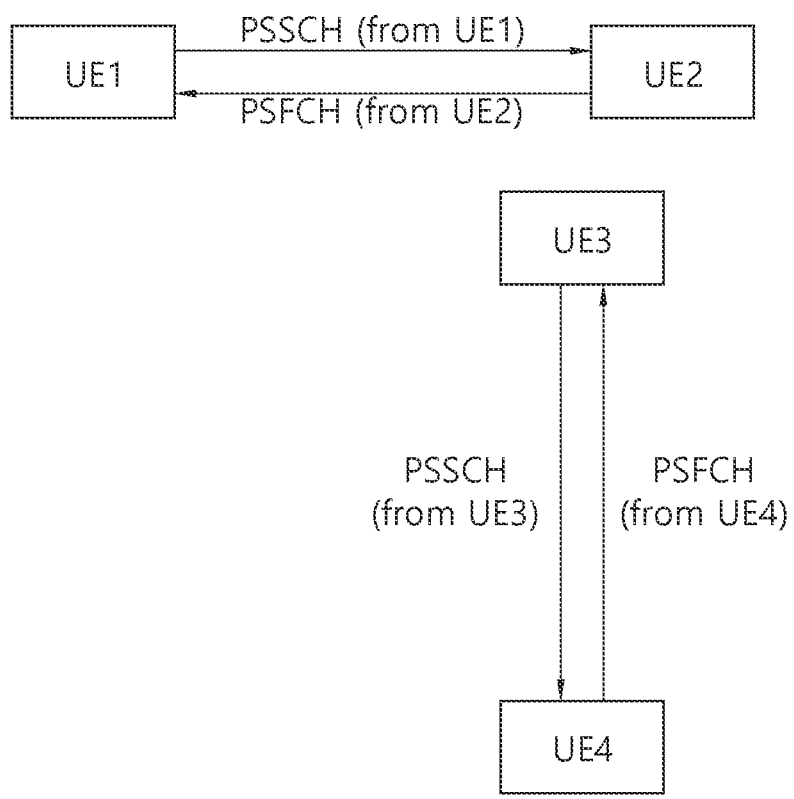
FIG. 12 shows a diagram for explaining a problem in that a UE cannot detect a specific PSFCH signal due to a large difference in receive power at a PSFCH receiving end, based on an embodiment of the present disclosure.

FIG. 12 shows a diagram for explaining a problem in that a UE cannot detect a specific PSFCH signal due to a large difference in receive power at a PSFCH receiving end, based on an embodiment of the present disclosure. The embodiment of FIG. 12 may be combined with various embodiments of the present disclosure.

Referring to FIG. 12, if a PSFCH transmitted by a UE2 to a UE1 and a PSFCH transmitted by a UE4 to a UE3 are CDM, that is, if the PSFCH from the UE2 and the PSFCH from the UE4 are transmitted on overlapping time and frequency resources by using different codes, the UE3 cannot detect the PSFCH transmitted by the UE4 if receive power of the PSFCH transmitted by the UE2 is greater than receive power of the PSFCH transmitted by the UE4 by a certain level in terms of the UE3.

Figure 13:
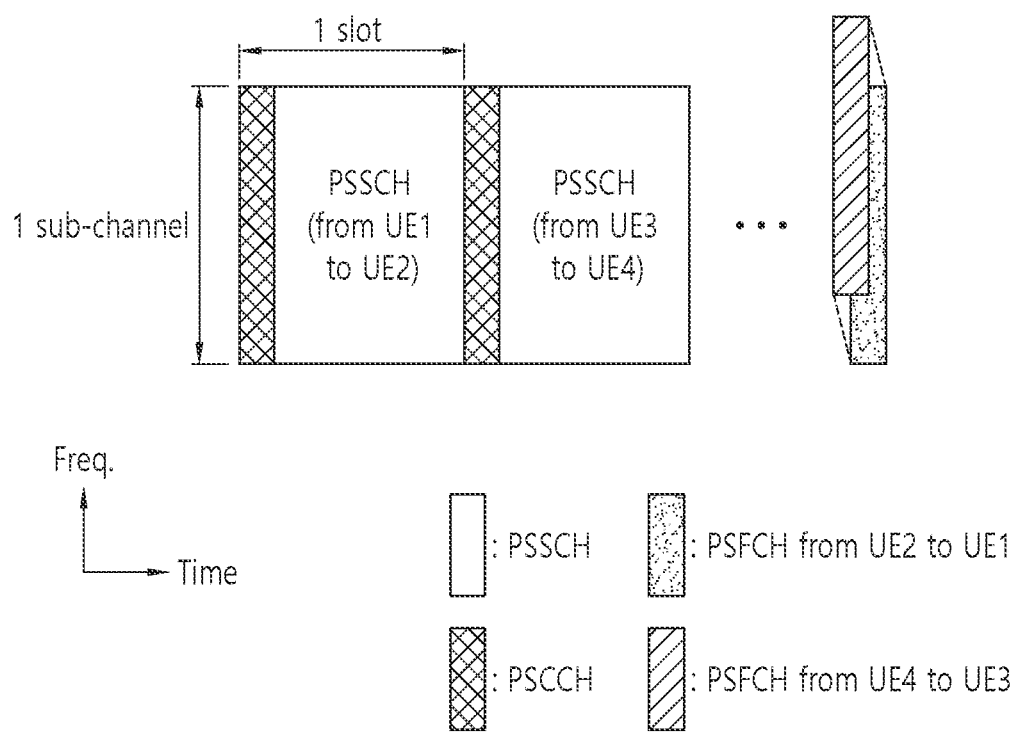
FIG. 13 shows an example in which a plurality of PSFCHs are CDM, based on an embodiment of the present disclosure.

FIG. 13 shows an example in which a plurality of PSFCHs are CDM, based on an embodiment of the present disclosure. The embodiment of FIG. 13 may be combined with various embodiments of the present disclosure.

Referring to FIG. 13, a PSFCH corresponding to a PSSCH transmitted from a UE1 to a UE2 and a PSFCH corresponding to a PSSCH transmitted from a UE3 to a UE4 may be CDM.

Furthermore, if a plurality of PSFCH resources are adjacent on a frequency domain, an interference problem (hereinafter, an inter-band emission (IBE) problem) may occur. IBE may mean that transmit power of signal(s) transmitted by a UE is emitted in a band other than an intended frequency band, thereby reducing reception quality by interfering with other signals being transmitted in a frequency band not used by the UE. For example, if a PSFCH resource #1 and a PSFCH resource #2 are adjacent on a frequency domain, HARQ feedback received through the PSFCH resource #1 and HARQ feedback received through the PSFCH resource #2 by the UE may interfere with each other. Therefore, due to the above IBE problem, the UE may fail to receive HARQ feedback.

Meanwhile, PSFCH resources for PSSCHs transmitted in a plurality of slots may occur in the same slot. In this case, considering latency requirements and performance of the corresponding service, it may be inefficient for a UE to transmit a PSFCH corresponding to a PSSCH transmitted in a slot far in time from a slot in which PSFCH resources exists. For example, if a first UE transmits data for service(s) requiring low latency to a second UE through a specific PSSCH resource, it may be unnecessary for the second UE to transmit a PSFCH to the first UE in a slot far in time from a slot in which the specific PSSCH resource exists. In this case, in order to satisfy latency requirements, the UE receiving the PSSCH may omit transmission of the PSFCH. That is, it may be efficient for the UE to preferentially secure a PSFCH resource corresponding to a resource for a PSSCH transmitted in a slot close in time to a slot in which PSFCH resources exists.

Meanwhile, in the case of groupcast in the next-generation system, a plurality of receiving UE which has received a PSCCH may transmit HARQ feedback for the same PSSCH, respectively. In this case, there may be a plurality of PSFCH resources corresponding to a specific PSSCH, and each of PSFCH resources may be distinguished.

On the other hand, in the case of groupcast in the next-generation system, a plurality of receiving UEs which has received a PSSCH may share a PSFCH resource for HARQ feedback for the same PSSCH. If a transmitting UE receives HARQ feedback for a first PSSCH from at least one of a plurality of receiving UEs through a first PSFCH resource after the transmitting UE transmits the first PSSCH to the plurality of receiving UEs, and the transmitting UE receives HARQ feedback for a second PSSCH from a specific receiving UE through a second PSFCH resource after the transmitting UE transmits the second PSSCH to the specific receiving UE, receive power for the first PSFCH of the transmitting UE may be relatively greater than receive power for the second PSFCH. Therefore, a serious IBE problem between PSFCH resources may occur.

Hereinafter, based on an embodiment of the present disclosure, a method for efficiently allocating PSFCH resource(s) and an apparatus supporting the same are proposed. In various embodiments of the present disclosure, the operation order of the UE may be changed. For example, in the embodiment of FIG. 14, S1430 may be performed before S1410.

Figure 14:
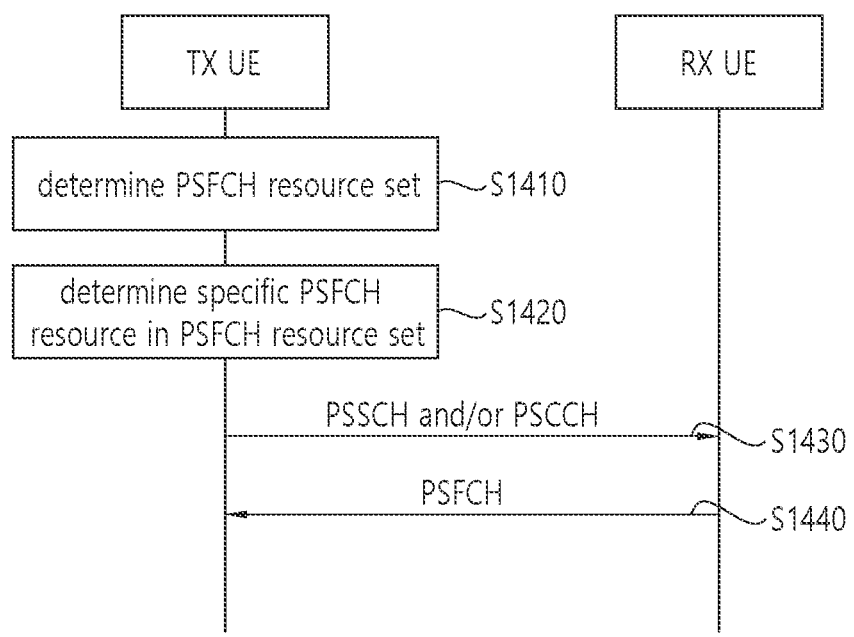
FIG. 14 shows a procedure for a transmitting UE to select/determine PSFCH resource(s), based on an embodiment of the present disclosure.

FIG. 14 shows a procedure for a transmitting UE to select/determine PSFCH resource(s), based on an embodiment of the present disclosure. The embodiment of FIG. 14 may be combined with various embodiments of the present disclosure.

Referring to FIG. 14, in step S1410, the transmitting UE may select/determine/allocate a PSFCH resource set. For example, the transmitting UE may select/determine/allocate the PSFCH resource set based on sub-channel(s) allocated for a PSSCH resource and/or a slot in which a PSSCH is transmitted and/or information related to PSSCH transmission. For example, the information related to PSSCH transmission may include at least one of DMRS sequence(s) or an ID (e.g., source ID) of the transmitting UE. In the present disclosure, a sub-channel may include one or more resource blocks (RBs).

For example, the transmitting UE may select/determine the PSFCH resource set based on the DMRS sequence(s) used for PSSCH transmission or parameter value(s) for generating the DMRS sequence(s). For example, the transmitting UE may select/determine the PSFCH resource set based on the DMRS sequence(s) used for PSCCH transmission related to the PSSCH or parameter value(s) for generating the DMRS sequence(s). For example, the transmitting UE may select/determine the PSFCH resource set based on a modulo value of the ID (e.g., source ID) of the transmitting UE. Through this, even if a plurality of PSSCHs overlap between sub-channels, the transmitting UE can distinguish PSFCH resource sets related to the plurality of PSSCHs.

Figure 15:
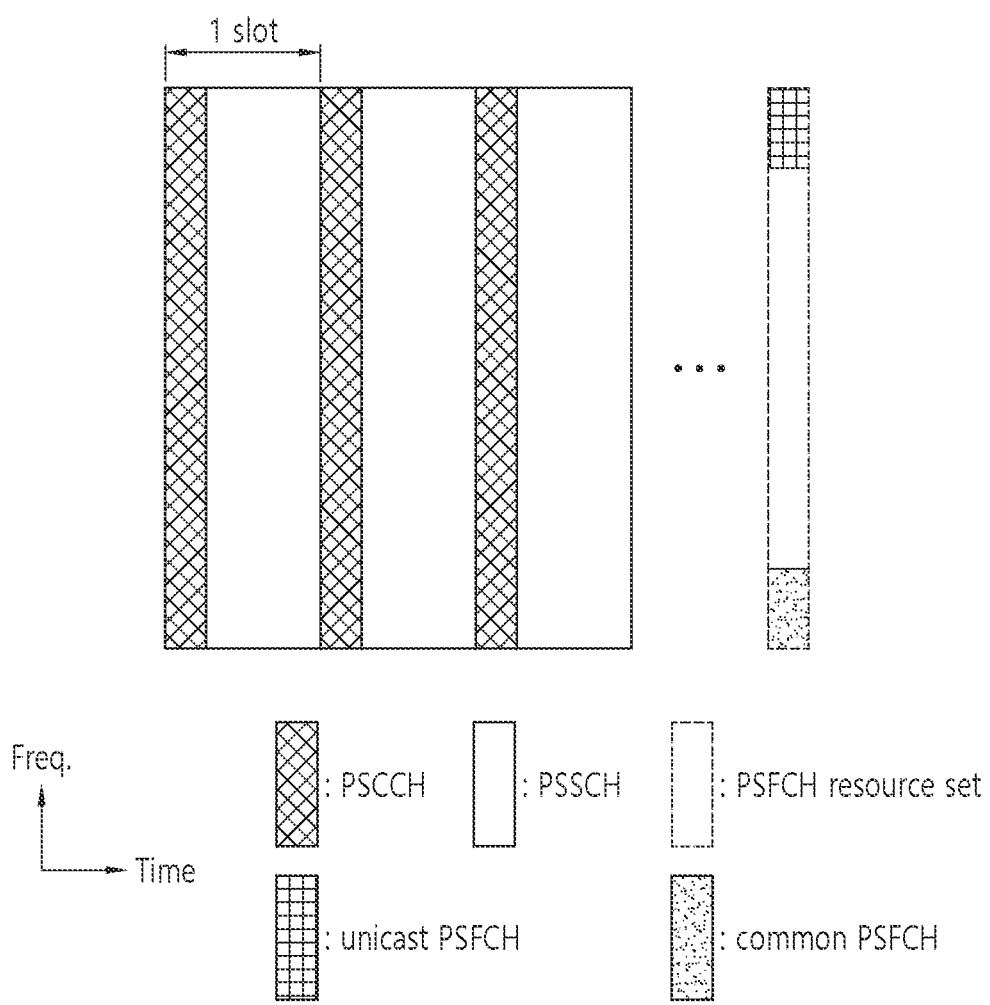
FIG. 15 shows a method for determining a PSFCH resource set, based on an embodiment of the present disclosure.

FIG. 15 shows a method for determining a PSFCH resource set, based on an embodiment of the present disclosure. The embodiment of FIG. 15 may be combined with various embodiments of the present disclosure.

Referring to FIG. 15, the transmitting UE may select/determine the PSFCH resource set based on at least one of sub-channel(s) allocated for a PSSCH resource, a slot in which a PSSCH is transmitted, or information related to PSSCH transmission.

Referring back to FIG. 14, in step S1420, the transmitting UE may select/determine/allocate a specific PSFCH resource in the PSFCH resource set based on a cast type and/or an HARQ feedback method/option. For example, the cast type may be unicast or groupcast.

For example, the HARQ feedback method/option may be divided into two types. According to the first HARQ feedback method/option, the transmitting UE may transmit a PSSCH to a plurality of receiving UEs in groupcast, and receiving UE(s) may transmit HARQ feedback related to the PSSCH to the transmitting UE through a common PSFCH resource. In this case, the receiving UE(s) may transmit NACK to the transmitting UE through the common PSFCH resource only if decoding of the PSSCH fails. On the other hand, if the receiving UE(s) succeeds in decoding the PSSCH, the receiving UE(s) may not transmit ACK to the transmitting UE.

According to the second HARQ feedback method/option, the transmitting UE may transmit a PSSCH to a plurality of receiving UEs in groupcast, and receiving UE(s) may transmit HARQ feedback related to the PSSCH to the transmitting UE through different PSFCH resources. In this case, if decoding of the PSSCH fails, the receiving UE(s) may transmit NACK to the transmitting UE through individual PSFCH resource(s). In addition, if the receiving UE(s)

succeeds in decoding the PSSCH, the receiving UE(s) may transmit ACK to the transmitting UE through individual PSFCH resource(s).

In the present disclosure, for convenience of description, a PSFCH resource for unicast may be referred to as a unicast PSFCH resource, and a PSFCH resource related to the first HARQ feedback method/option in groupcast may be referred to as a common PSFCH resource, and a PSFCH resource related to the second HARQ feedback method/option in groupcast may be referred to as an individual PSFCH resource.

Based on an embodiment of the present disclosure, in the case of unicast and in the case of groupcast in which a PSFCH resource are shared among a plurality of PSSCH receiving UEs, the transmitting UE may select/determine different PSFCH resources. In addition, the transmitting UE may secure N RBs between a unicast PSFCH resource and a common PSFCH resource. For example, N may be a positive integer. That is, one or more RB intervals may be secured between the unicast PSFCH resource and the common PSFCH resource. For example, a base station may configure the RB interval or an offset value for designating the RB location for the PSFCH resource to the transmitting UE for each resource pool. For example, the base station may pre-configure the RB interval or an offset value for designating the RB location for the PSFCH resource to the transmitting UE for each resource pool. For example, the RB interval or an offset value for designating the RB location for the PSFCH resource may be predefined in the transmitting UE for each resource pool.

Figure 16:
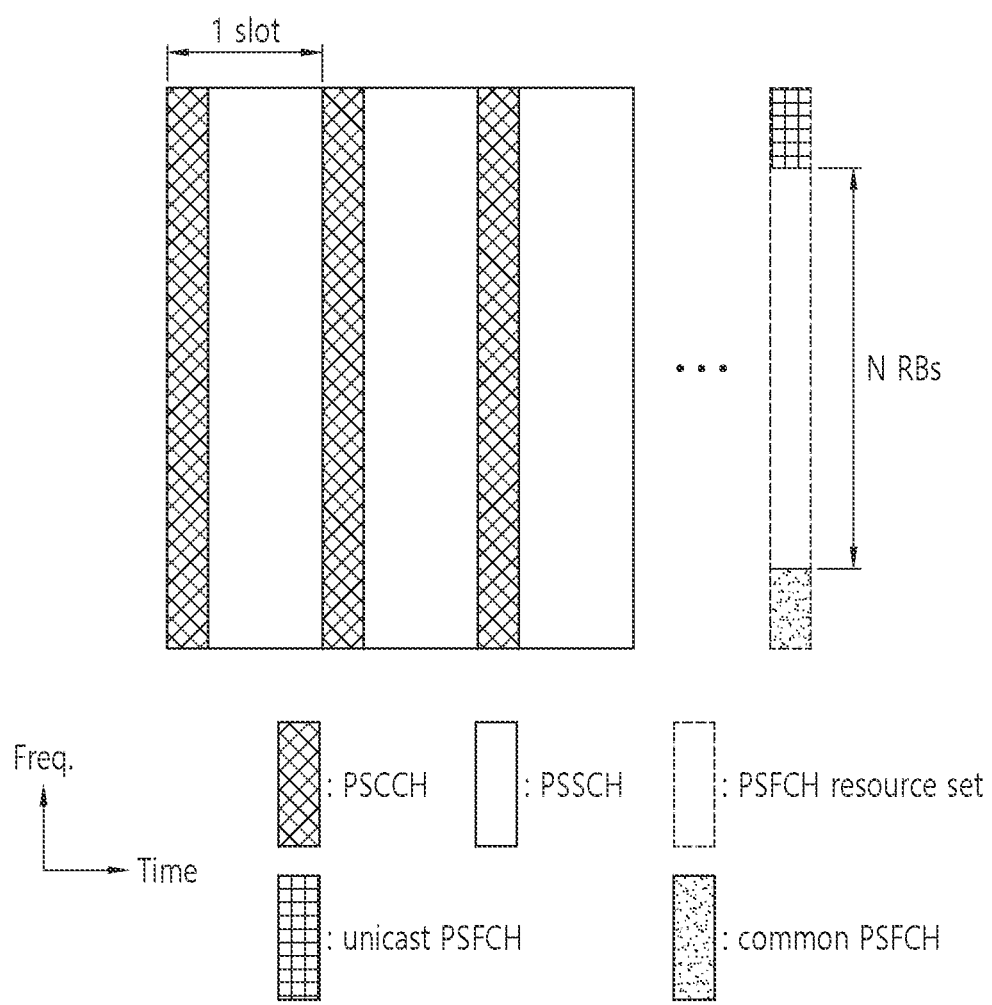
FIG. 16 shows a method for securing one or more RB intervals between a unicast PSFCH and a common PSFCH, based on an embodiment of the present disclosure.

FIG. 16 shows a method for securing one or more RB intervals between a unicast PSFCH and a common PSFCH, based on an embodiment of the present disclosure. The embodiment of FIG. 16 may be combined with various embodiments of the present disclosure.

Referring to FIG. 16, an interval N RBs may be secured between the unicast PSFCH and the common PSFCH, and thus the IBE problem between PSFCH resources may be alleviated.

Based on an embodiment of the present disclosure, in the case of unicast, the transmitting UE may select/determine different unicast PSFCH resources for each unicast session. For example, if the transmitting UE establishes unicast sessions with a plurality of different receiving UEs, the transmitting UE may select/determine different unicast PSFCH resources for each unicast session.

Figure 17:
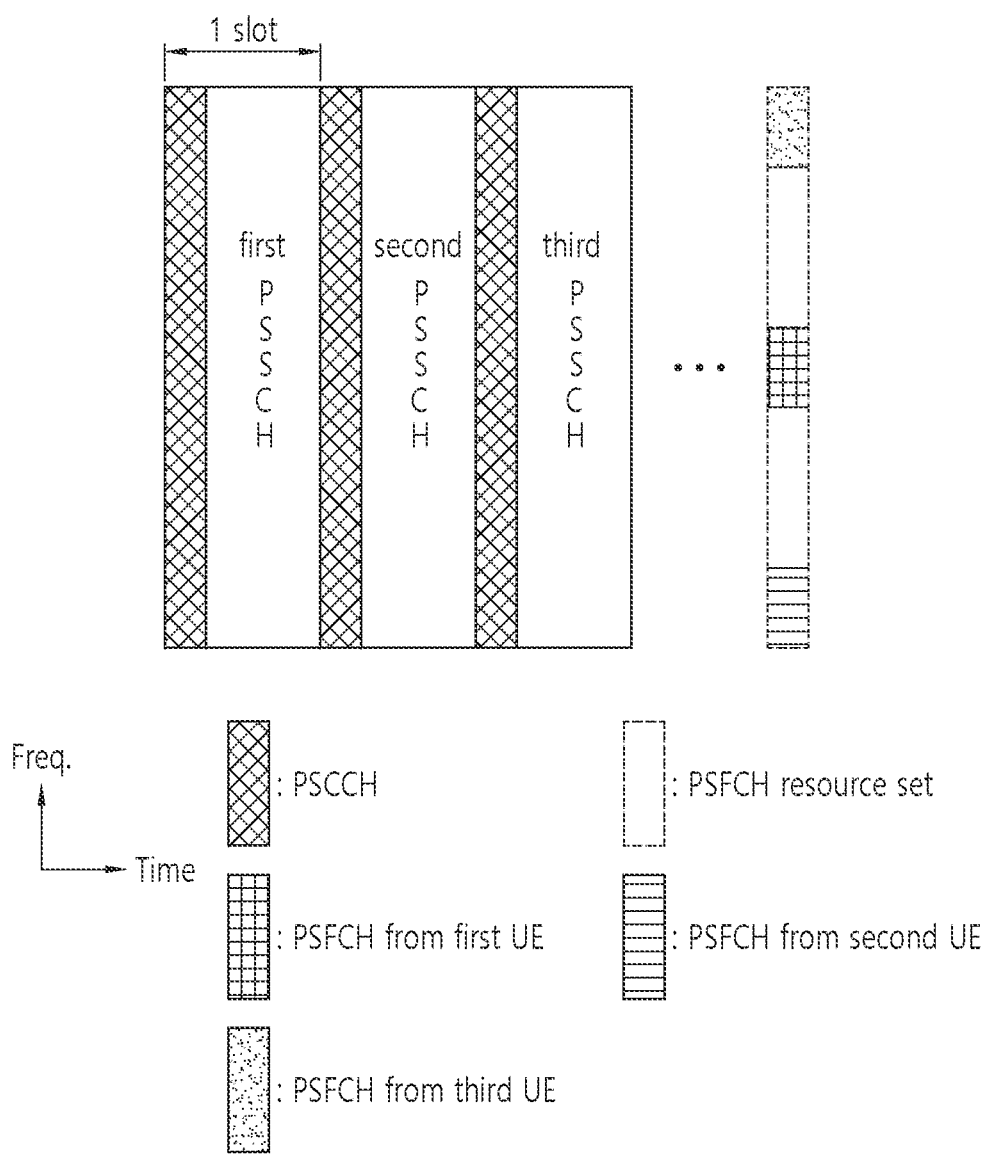
FIG. 17 shows a method in which different unicast PSFCH resources are selected/determined for each unicast session, based on an embodiment of the present disclosure.

FIG. 17 shows a method in which different unicast PSFCH resources are selected/determined for each unicast session, based on an embodiment of the present disclosure. The embodiment of FIG. 17 may be combined with various embodiments of the present disclosure.

Referring to FIG. 17, the transmitting UE may establish unicast sessions with a first UE, a second UE and a third UE, and may transmit a first PSSCH, a second PSSCH and a third PSSCH to the first UE, the second UE and the third UE, respectively. In this case, the transmitting UE may select/determine different unicast PSFCH resources for each unicast session. That is, the transmitting UE may differently select/determine a PSFCH resource for the first UE, a PSFCH resource for the second UE, and a PSFCH resource for the third UE.

Based on an embodiment of the present disclosure, if PSFCH resources are divided between PSSCH receiving UEs in groupcast, the transmitting UE may receive HARQ feedback through a plurality of PSFCH resources. In the PSFCH resource set, N RB intervals may exist between a PSFCH resource corresponding to unicast and a PSFCH resource corresponding to groupcast in which PSFCH resources are divided between a plurality of PSSCH receiving UEs. That is, the transmitting UE may receive or have different offsets between PSFCH resource sets based on a cast type and/or whether a PSFCH resource are shared.

Referring back to FIG. 14, in step S1430, the transmitting UE may transmit the PSSCH and/or the PSCCH to the receiving UE.

In step S1440, the transmitting UE may receive HARQ feedback for the PSSCH and/or the PSCCH from the receiving UE through a specific PSFCH resource in the PSFCH resource set. For example, the specific PSFCH resource may be determined by the transmitting UE based on the cast type and/or the HARQ feedback method/option.

Figure 18:
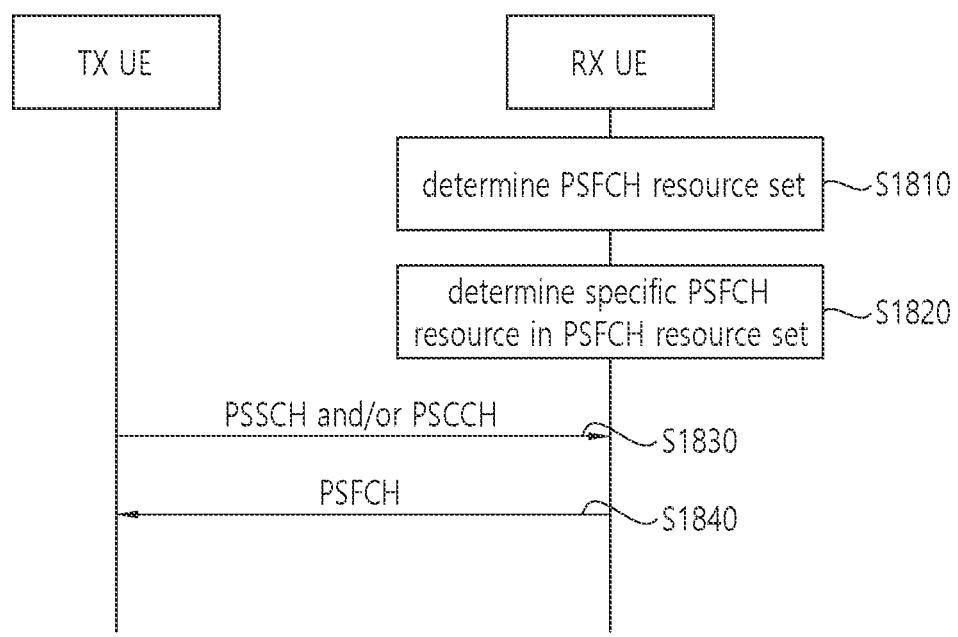
FIG. 18 shows a procedure for a receiving UE to select/determine PSFCH resource(s), based on an embodiment of the present disclosure.

FIG. 18 shows a procedure for a receiving UE to select/determine PSFCH resource(s), based on an embodiment of the present disclosure. The embodiment of FIG. 18 may be combined with various embodiments of the present disclosure.

Referring to FIG. 18, in step S1810, the receiving UE may select/determine/allocate a PSFCH resource set. For example, the receiving UE may select/determine/allocate the PSFCH resource set based on sub-channel(s) allocated for a PSSCH resource and/or a slot in which a PSSCH is transmitted and/or information related to PSSCH transmission. For example, the information related to PSSCH transmission may include at least one of DMRS sequence(s) or an ID (e.g., source ID) of the transmitting UE. A method for the receiving UE to select/determine the PSFCH resource set may be the same as the method for the transmitting UE to select/determine the PSFCH resource set.

In step S1820, the receiving UE may select/determine/allocate a specific PSFCH resource in the PSFCH resource set based on the cast type and/or the HARQ feedback method/option. A method for the receiving UE to select/determine the specific PSFCH resource in the PSFCH resource set may be the same as the method for the transmitting UE to select/determine the specific PSFCH resource in the PSFCH resource set. If each of PSFCH resources is distinguished between PSSCH receiving UEs in groupcast, each receiving UE may select a PSFCH resource based on receiving UE information (e.g., an identifier provided by a higher layer or an ID (e.g., source ID) of the receiving UE).

In step S1830, the receiving UE may receive the PSSCH and/or the PSCCH from the transmitting UE.

In step S1840, the receiving UE may transmit HARQ feedback for the PSSCH and/or the PSCCH to the transmitting UE through the specific PSFCH resource in the PSFCH resource set. For example, the specific PSFCH resource may be determined by the receiving UE based on the cast type and/or the HARQ feedback method/option.

Figure 19:
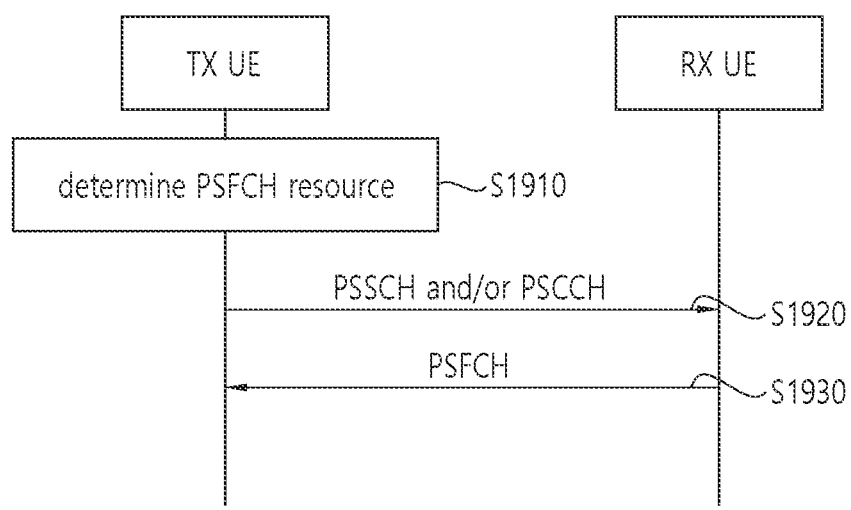
FIG. 19 shows a procedure for a transmitting UE to determine PSFCH resource(s), based on an embodiment of the present disclosure.

FIG. 19 shows a procedure for a transmitting UE to determine PSFCH resource(s), based on an embodiment of the present disclosure. The embodiment of FIG. 19 may be combined with various embodiments of the present disclosure.

Referring to FIG. 19, in step S1910, the transmitting UE may determine/select/allocate a PSFCH resource. For example, the transmitting UE may select the PSFCH resource to be used for HARQ feedback, based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method/option, information related to a PSSCH transmitting UE, information related to PSSCH transmission, or information related to a PSSCH receiving UE. For example, the transmitting UE may select the PSFCH resource to be used for HARQ feedback, based on a slot corresponding to PSSCH transmission, sub-channel(s) corresponding to PSSCH transmission, information related to a PSSCH transmitting UE, and information related to a PSSCH receiving UE. For example, the information related to the PSSCH receiving UE may be determined based on the cast type and/or the HARQ feedback method/option. For example, the information related to the PSSCH transmitting UE may be information on a UE transmitting the PSSCH (e.g., a source ID of the transmitting UE). For example, the information related to the PSSCH receiving UE may be information on a UE receiving the PSSCH (e.g., an identifier provided by a higher layer or a source ID of the receiving UE). For example, the information related to PSSCH transmission may include at least one of DMRS sequence(s) used for PSSCH transmission or parameter(s) for generating the DMRS sequence(s), or DMRS sequence(s) used for PSCCH transmission corresponding to the PSSCH or parameter(s) for generating the DMRS sequence(s).

For example, the PSFCH resource may correspond to a combination of a resource block (RB) and/or a code domain resource. For example, a sub-channel may include one or more RBs. For example, the cast type may be unicast or groupcast. For example, the HARQ feedback method/option may be divided into two types. According to the first HARQ feedback method/option, the transmitting UE may transmit a PSSCH to a plurality of receiving UEs in groupcast, and receiving UE(s) may transmit HARQ feedback related to the PSSCH to the transmitting UE through a common PSFCH resource. In this case, the receiving UE(s) may transmit NACK to the transmitting UE through the common PSFCH resource only if decoding of the PSSCH fails. On the other hand, if the receiving UE(s) succeeds in decoding the PSSCH, the receiving UE(s) may not transmit ACK to the transmitting UE. According to the second HARQ feedback method/option, the transmitting UE may transmit a PSSCH to a plurality of receiving UEs in groupcast, and receiving UE(s) may transmit HARQ feedback related to the PSSCH to the transmitting UE through different PSFCH resources.

Meanwhile, a plurality of transmitting UEs may transmit a plurality of PSSCHs having different combinations of sub-channel(s) and a slot to a plurality of receiving UEs, respectively. In addition, the plurality of receiving UEs may transmit a plurality of PSFCHs corresponding to the plurality of PSSCHs to the plurality of transmitting UEs. In this case, since receive power of the plurality of PSFCHs may be greatly different from the perspective of the plurality of transmitting UEs, an inter-band emission (IBE) problem may occur. Accordingly, in the above situation, the transmitting UE may secure a plurality of RB gaps between the plurality of PSFCH resources in consideration of inter-band emission (IBE) between the plurality of PSFCHs corresponding to the plurality of PSSCHs.

Figure 20:
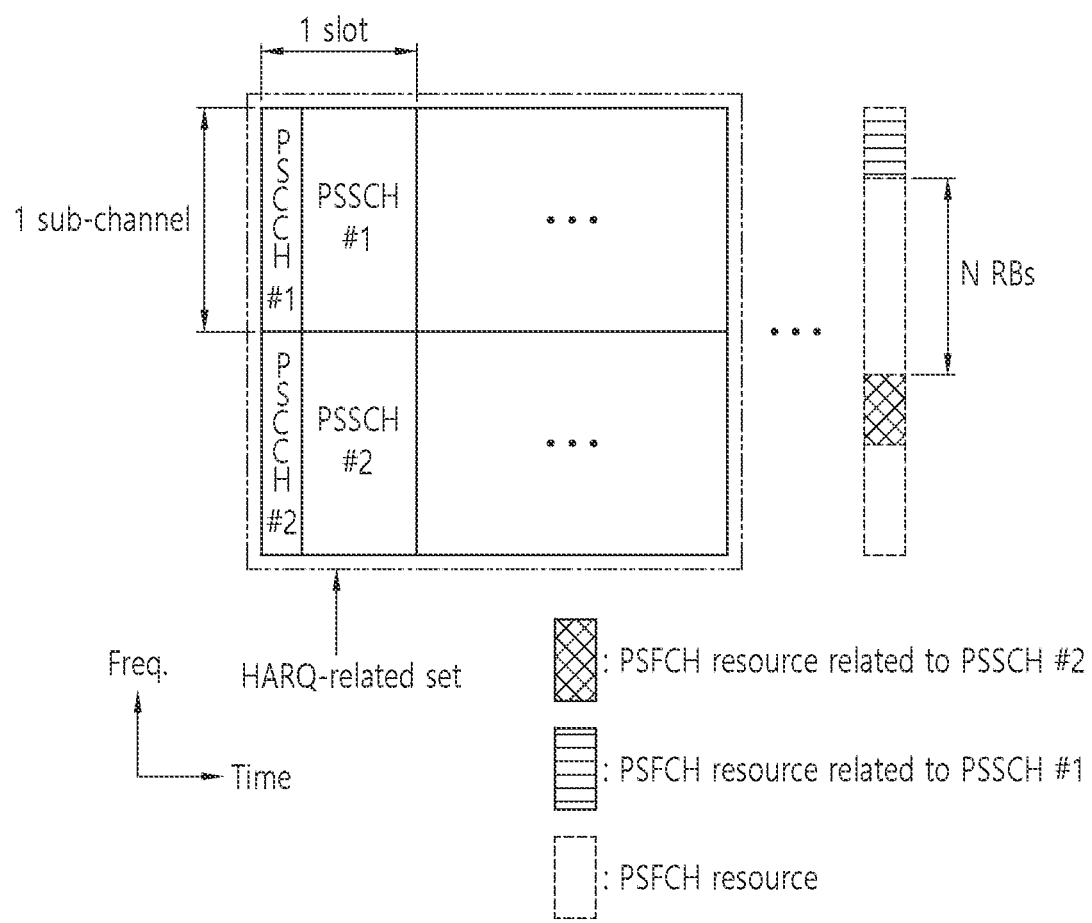
FIG. 20 shows a case in which N RB intervals exist between a plurality of PSFCH resources, based on an embodiment of the present disclosure.

FIG. 20 shows a case in which N RB intervals exist between a plurality of PSFCH resources, based on an embodiment of the present disclosure. The embodiment of FIG. 20 may be combined with various embodiments of the present disclosure.

For example, as in the embodiment of FIG. 20, in the case of a plurality of PSFCH resources related to a plurality of PSSCHs (i.e., PSSCH #1 and PSSCH #2) transmitted in the same slot and different sub-channels, N RB intervals may exist between a plurality of PSFCH resources. For example, N may be a positive integer.

Figure 21:
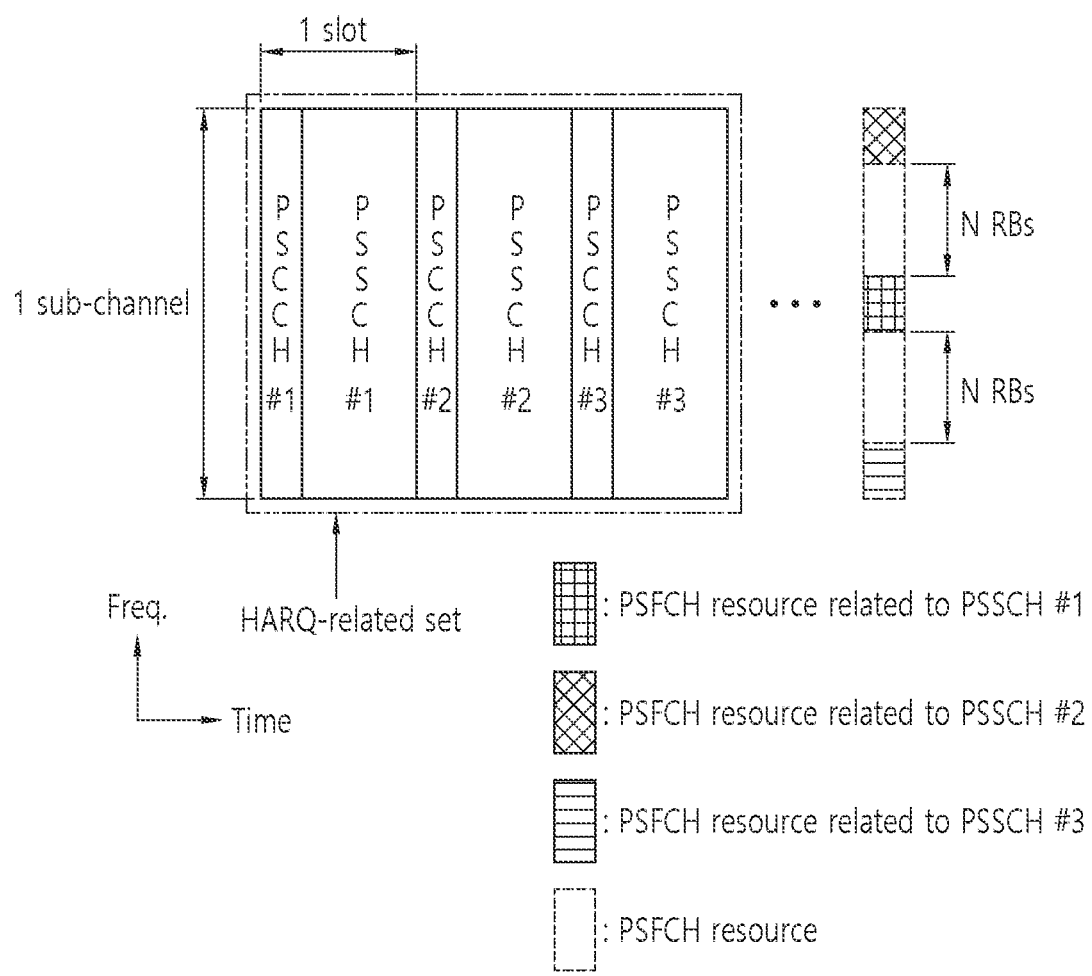
FIG. 21 shows a case in which N RB intervals exist between a plurality of PSFCH resources, based on an embodiment of the present disclosure.

FIG. 21 shows a case in which N RB intervals exist between a plurality of PSFCH resources, based on an embodiment of the present disclosure. The embodiment of FIG. 21 may be combined with various embodiments of the present disclosure.

For example, as in the embodiment of FIG. 21, in the case of a plurality of PSFCH resources related to a plurality of PSSCHs (i.e., PSSCH #1 to PSSCH #3) transmitted in the same sub-channel and different slots, N RB intervals may exist between a plurality of PSFCH resources. For example, N may be a positive integer.

Specifically, for example, PSFCH resources according to the change of the two parameters may have a hierarchical structure. For example, the two parameters may be slot-related information and sub-channel-related information.

For example, if an RB interval between a plurality of PSFCH resources related to a plurality of PSSCHs transmitted in the same slot and different sub-channels is N, and an RB interval between a plurality of PSFCH resources related to a plurality of PSSCHs transmitted in the same sub-channel and different slots is M, a value of N may be expressed as a value of M and the number of slots in a HARQ-related set. For example, a value of N may be determined or derived based on a value of M and the number of slots in the HARQ-related set. In the present disclosure, the HARQ-related set may be a set of slots for PSCCHs and/or PSSCHs related to PSFCHs that can be transmitted in the same slot. If a value of N is expressed as a value of M and the number of slots in the HARQ-related set, a large RB interval between a plurality of PSFCH resources may be maintained in case some slots in the HARQ-related set are used for PSSCH transmission or in case PSFCH resources are used for PSSCH transmission of some slots. Therefore, in case the transmitting UE receives HARQ feedback through a plurality of PSFCH resources, the IBE problem can be greatly alleviated.

Alternatively, for example, if an RB interval between a plurality of PSFCH resources related to a plurality of PSSCHs transmitted in the same slot and different sub-channels is N, and an RB interval between a plurality of PSFCH resources related to a plurality of PSSCHs transmitted in the same sub-channel and different slots is M, a value of M may be expressed as a value of N and the number of sub-channels available for PSSCH transmission. For example, a value of M may be determined or derived based on a value of N and the number of sub-channels available for PSSCH transmission. Specifically, for example, the transmitting UE may relatively center a PSFCH resource set corresponding to a specific slot in a resource pool by using an RB offset, etc. If a value of M is expressed as a value of N and the number of sub-channels available for PSSCH transmission, the transmitting UE may set/configure an RB gap above and/or below an RB set in which PSFCH resource(s) is located, in case the frequency of use of PSFCH resources related to a PSSCH actually transmitted in a specific slot is high. Accordingly, emission from different resource pools or Uu links may be alleviated.

Meanwhile, different PSSCH transmissions may collide in a specific sub-channel and a specific slot. For example, if one transmitting UE transmits a plurality of PSSCHs overlapping in time and frequency resource(s) through spatial multiplexing, different PSSCH transmissions may collide in a specific sub-channel and/or a specific slot. For example, if a plurality of transmitting UEs transmit a plurality of PSSCHs overlapping in time and frequency resource(s) (e.g., if a distance between UEs transmitting PSSCHs is large (i.e., a hidden node problem)), different PSSCH transmissions may collide in a specific sub-channel and/or a specific slot. If a receiving UE can distinguish different PSSCHs transmitted from transmitting UE(s), it may also be required to separate PSFCH resources related to the plurality of PSSCHs. For example, the plurality of PSSCHs may be transmitted by one transmitting UE. Alternatively, for example, the plurality of PSSCHs may be transmitted by a plurality of transmitting UEs, respectively. For example, if sub-channels through which a plurality of PSCCHs related to the plurality of PSSCHs are transmitted are different and/or if DMRS sequences for a plurality of PSCCHs or parameters for generating the DMRS sequences are different and/or if DMRS sequences for a plurality of PSSCHs or parameters for generating the DMRS sequences are different and/or all or part of source IDs is different, the receiving UE may distinguish different PSSCHs sharing some resources with each other. In general, since each of different receiving UEs may receive each of a plurality of different PSCCHs, RB intervals may need to be secured as much as possible, in the case of PSFCH resources corresponding to different PSSCHs. This may be to alleviate the IBE problem in terms of a UE receiving HARQ feedback through PSFCHs, as described in detail above. That is, in the case of a plurality of PSSCHs transmitted by different transmitting UEs or by the same transmitting UE through a combination of a specific slot and sub-channel(s), N RBs may exist between a plurality of PSFCH resources corresponding to the plurality of PSSCHs. For example, N may be a positive integer.

Meanwhile, in the case of HARQ feedback in groupcast, each receiving UE receiving the same PSSCH may allocate a PSFCH resource. If the receiving UE can perform power control when transmitting a PSFCH, and similar receive power can be guaranteed at a PSSCH transmitting UE through the power control, a Near-Far problem can be avoided or mitigated even if CDM between the corresponding PSFCH resources is supported. In addition, even if PSFCH resources are allocated in adjacent RBs, the IBE problem can be alleviated. On the other hand, if the receiving UE does not properly perform power control for a PSFCH, the above-described problem may occur. Accordingly, if the receiving UE cannot properly perform power control for a PSFCH, an interval N RBs between PSFCH resources may need to be secured. Accordingly, a multiplexing method between PSFCH resources for a plurality of receiving UEs for the same PSSCH in groupcast may be configured differently, based on the power control method for the PSFCH of the receiving UE and/or configuration(s) for each resource pool. For example, a base station may configure or pre-configure the configuration(s) for each resource pool to the UE. For example, a base station may transmit the configuration(s) for each resource pool to the UE.

Additionally, based on an embodiment of the present disclosure, a PSFCH resource selection/allocation scheme may be defined by Equation. For example, PSFCH resources may exist in a set of a combination of RB(s) in which PSFCH resources may exist and/or code domain resource(s), and each PSFCH resource may have a different index based on the combination of RB(s) and/or code domain resource(s).

For example, a virtual PSFCH resource index may be defined as in Equation 1 or Equation 2.

$$\text{virtual } PSFCH \text{ resource index} = \quad \text{[Equation 1]}$$
(specific subshannel corresponding to $PSCCH$ or $PSSCH$) $\times$
(first step) +
(specific slot corresponding to $PSSCH$) $\times$ (second step) +
(information on $PSSCH$ transmitting $UE$) $\times$ (third step) +
(information on $PSSCH$ receiving $UE$) $\times$ (fourth step) +
index_offset $$\text{virtual } PSFCH \text{ resource index} = \quad \text{[Equation 2]}$$
(specific slot corresponding to $PSCCH$ or $PSSCH$) $\times$
(first step) + (information on $PSSCH$ transmitting $UE$) $\times$
(second step) + (information on $PSSCH$ receiving $UE$) $\times$
(third step) + index_offset In Equation 2, the index_offset may be a value derived/determined based on a specific sub-channel corresponding to a PSCCH or a PSSCH. For example, the index_offset may be a value that changes based on information related to a specific sub-channel corresponding to a PSCCH or a PSSCH. For example, the index_offset may be configured such that a PSFCH resource coincides with a PSSCH resource related to the PSFCH in a frequency domain or a PSFCH resource is smaller than a PSSCH resource related to the PSFCH in a frequency domain.

The virtual PSFCH resource may correspond to a logical resource. If the PSFCH resource selection scheme corresponds to a logical resource, a process of mapping the logical PSFCH resource to a physical resource may be required. For example, the UE may map the virtual PSFCH resource to the physical resource through a modulo function. In the above process, the size of the physical resource for the PSFCH may be smaller than the size of the logical resource in terms of the frequency domain and/or the time domain. For example, if the UE performs sidelink communication in a narrow band, the size of the physical resource for the PSFCH may be smaller than the size of the logical resource in terms of the frequency domain and/or the time domain. For example, if the size of the physical resource is smaller than the size of the logical resource, the UE may allocate some PSFCH resources to overlap each other in the frequency domain and/or the time domain. For example, if the size of the physical resource is smaller than the size of the logical resource, the UE may not allocate PSFCH resources to some virtual PSFCH resource indexes.

The mapping process to the physical resource may be performed in units of all logical resources or may be performed for a group of a specific level. For example, in the case of the level 1-group and the level 2-group, overlapping of PSFCH resources between groups may not be allowed, and from the level 3-group, overlapping of some PSFCH resources may be allowed depending on the size of the physical resource.

In the present disclosure, as an example of PSFCH resource allocation/configuration/determination according to information related to a PSSCH receiving UE, PSFCH resources to be used/transmitted by UEs receiving the same PSSCH are preferentially code division multiplexing (CDM), and PSFCH resource(s) may be allocated to adjacent RB(s) in case more PSFCH resources are required.

In the present disclosure, as another example of PSFCH resource allocation/configuration/determination according to information related to a PSSCH receiving UE, PSFCH resources to be used/transmitted by UEs receiving the same PSSCH are allocated/configured/determined in the form of frequency division multiplexing (FDM) within a specific frequency resource domain, and additional PSFCH resource(s) may be allocated/configured/determined in the form of CDM within the specific frequency resource domain if PSFCH resource(s) are additionally required after allocation/configuration/determination of PSFCH resources in the form of FDM. In this case, for example, the specific frequency resource domain may be specific sub-channel(s). In addition, for example, if PSFCH resource(s) is additionally required after the allocation/configuration/determination of PSFCH resources in the form of FDM and the allocation/configuration/determination of PSFCH resources in the form of CDM, additional PSFCH resource(s) may be allocated/configured/determined in the form of FDM within a frequency resource domain extended from the specific frequency resource domain. In this case, for example, the frequency resource domain extended compared to the specific frequency resource domain may include at least one other sub-channel in addition to the specific sub-channel(s).

In the present disclosure, as another example of PSFCH resource allocation/configuration/determination according to information related to a PSSCH receiving UE, PSFCH resources to be used/transmitted by UEs receiving the same PSSCH are allocated/configured/determined in the form of FDM within a specific frequency resource domain, and additional PSFCH resource(s) may be allocated/configured/determined in the form of CDM within the specific frequency resource domain if PSFCH resource(s) are additionally required after allocation/configuration/determination of PSFCH resources in the form of FDM. In this case, for example, the specific frequency resource domain may be a frequency resource domain including sub-channel(s) to which one or more PSSCHs corresponding to the PSFCH resources are allocated. In the case of the above scheme, PSFCH resources may be allocated/configured/determined based on the number of sub-channels to which one or more PSSCHs corresponding to the PSFCH resources are allocated and/or the size/number of frequency resource domains corresponding thereto.

In the present disclosure, as an example of a specific slot corresponding to a PSSCH, indexing for slots in the HARQ-related set may be set/configured in ascending order from a slot late in time to a slot early in time. That is, among a plurality of slots in the HARQ-related set, a slot close to a PSFCH resource related to the HARQ-related set may have a lower index value.

For example, a base station may configure or pre-configure the size of each step for the UE for each resource pool. Alternatively, the base station may configure or pre-configure the size of a specific step for the UE for each resource pool. In addition, the size of the remaining step may be implicitly derived by the UE according to the size of other steps and/or the range of value(s) that specific parameter(s) can have. For example, in Equation 1, the third step related to the information on the PSSCH transmitting UE and/or the fourth step related to the information on the PSSCH receiving UE may be set/configured to a value larger than the first step and the second step. In this case, for example, the information on the PSSCH transmitting UE may be an L1 layer source ID transmitted by the PSSCH transmitting UE to the PSSCH receiving UE through a SCI, and the information on the PSSCH receiving UE may be a member ID assigned in unicast and/or groupcast communication. This configuration method may be advantageous to a method of determining an RB value to which a PSFCH resource is allocated based on a specific cyclic shift value and/or a specific base sequence value, and after increasing the cyclic shift value and/or the base sequence value, determining an RB value again based on the increased cyclic shift value and the increased base sequence value. For example, contrary to the above method, the third step and/or the fourth step may be set/configured to a value smaller than the first step and/or the second step. This configuration method may be advantageous to a method of determining a cyclic shift value and/or a base sequence value based on a specific RB value to which a PSFCH resource is allocated, and after increasing the RB value, determining a cyclic shift and/or a base sequence value again based on the increased RB value.

For example, when allocating/configuring/determining PSFCH resource(s), preferentially selecting/determining a PSFCH resource group based on a starting sub-channel of a PSSCH, and after selecting/determining the PSFCH resource group, a PSFCH resource sub-group may be configured/determined within the PSFCH resource group based on a slot in which the PSSCH is received. In this case, for example, PSFCH resource sub-groups for different slots in which PSSCHs are received may be configured/determined in the form of FDM. As an example of the above scheme, PSFCH resources may be allocated/configured/determined in the form of FDM in units of a PSFCH resource sub-group (first scheme). For example, assuming that each PSFCH resource sub-group includes N RBs, the first N RBs may correspond to a first PSSCH reception slot, and the next N RBs may correspond to a second PSSCH reception slot. In this case, for example, a value of the second step may be set/determined to a value equal to the number of PSSCH reception slots or a value greater than the number of PSSCH reception slots. In addition, for example, if a scheme in which PSFCH resources are allocated/configured/determined in the form of CDM is additionally considered in the first scheme, a value of the second step may be set/determined to a value equal to the number of PSSCH reception slots or a value obtained by multiplying a value greater than the number of PSSCH reception slots by the number of cyclic shifts per an RB. As another example of the above method, PSFCH resources may be allocated/configured/determined in the form of FDM in units of an RB or an RB group (second scheme). For example, assuming that each PSFCH resource sub-group includes N RBs, a PSFCH resource corresponding to a first PSSCH reception slot and a PSFCH resource corresponding to a second PSSCH reception slot may be allocated/configured/determined in the form that is sequentially repeated in units of 1 RB. In this case, for example, a value of the second step may be set/determined to a value smaller than the number of PSSCH reception slots. Specifically, for example, a value of the second step may be set/determined to be in units of 1 RB, which is a value smaller than the number of PSSCH reception slots. In addition, for example, if a scheme in which PSFCH resources are allocated/configured/determined in the form of CDM is additionally considered in the second scheme, a value of the second step may be set/determined as a value obtained by multiplying a value smaller than the number of PSSCH reception slots by the number of cyclic shifts per an RB.

For example, PSFCH resources corresponding to PSSCHs transmitted in a plurality of slots may be allocated to the same slot. In this case, considering delay requirements and performance of services related to data transmitted through the PSSCHs, it may be inefficient for a receiving UE to transmit a PSFCH, corresponding to a PSSCH transmitted in a slot far away in a time domain from a slot to which a PSFCH resource is allocated, by using the slot to which the PSFCH resource is allocated. Alternatively, for example, if a first UE transmits data for a service requiring low latency to a second UE through a specific PSSCH resource, it may be unnecessary for the second UE to transmit a PSFCH to the first UE in a slot to which a PSFCH resource is allocated faraway in a time domain from a slot to which the specific PSSCH resource is allocated. In this case, for example, in order to satisfy a latency requirement of the service related to data transmitted through the PSSCH, the receiving UE may omit or not perform transmission of the PSFCH in the slot to which the PSFCH resource is allocated far away in the time domain from the slot in which the PSSCH is transmitted. Through this, it may be efficient for the receiving UE to preferentially secure PSFCH resource(s) corresponding to PSSCH(s) transmitted in slot(s) that is close in the time domain from a slot to which PSFCH resources are allocated. Meanwhile, for example, if PSFCH resources (e.g., frequency domain resources and/or code domain resources) are insufficient, the receiving UE may not preferentially allocate PSFCH resource(s) corresponding to a specific slot in which PSSCH(s) is transmitted. In this case, for example, the specific slot may be slot(s) close to a slot to which PSFCH resources are allocated or slot(s) far from a slot to which PSFCH resources are allocated. Alternatively, for example, if PSFCH resources (e.g., frequency domain resources and/or code domain resources) are insufficient, the receiving UE may equally reduce the allocation amount of PSFCH resources for each of a plurality of PSSCH transmissions related to/corresponding to a slot to which PSFCH resources are allocated. Through this, the receiving UE can efficiently operate limited PSFCH resources.

For example, the index_offset value may be set differently based on a PSFCH format. That is, PSFCH resource sets may be distinguished from each other for each PSFCH format. For example, the PSFCH format may include a sequence-based PSFCH format with one symbol, a PSFCH format with N symbols (e.g., N=2) in which a PSFCH format with one symbol is repeated, a PUCCH format 2-based PSFCH format, and/or a PSFCH format spanning all available symbols for sidelink in a slot. In this case, the UE may apply the index_offset value differently for each type of the PSFCH format.

For example, a plurality of HARQ-related sets may be configured in one resource pool. For example, the UE may configure a plurality of HARQ-related sets in one resource pool. That is, if each UE has a different processing time, and/or based on a service type and/or a cast type and/or a requirement (e.g., reliability and/or latency), a (minimum or maximum) time between a PSSCH transmission time and a PSFCH transmission time may be configured differently, and in this case, the HARQ-related set may be configured for each (minimum or maximum) time between each PSSCH transmission time and each PSFCH transmission time.

For example, based on the processing time of the UE, the (minimum or maximum) time between the PSSCH transmission time and the PSFCH transmission time may be different, and in this case, the UE may configure/set each HARQ-related set corresponding to the (minimum or maximum) time between each PSSCH transmission time and each PSFCH transmission time. Additionally/alternatively, for example, based on the service type, the (minimum or maximum) time between the PSSCH transmission time and the PSFCH transmission time may be different, and in this case, the UE may configure/set each HARQ-related set corresponding to the (minimum or maximum) time between each PSSCH transmission time and each PSFCH transmission time. Additionally/alternatively, based on the cast type, the (minimum or maximum) time between the PSSCH transmission time and the PSFCH transmission time may be different, and in this case, the UE may configure/set each HARQ-related set corresponding to the (minimum or maximum) time between each PSSCH transmission time and each PSFCH transmission time. Additionally/alternatively, based on service-related requirements (e.g., reliability and/or latency), the (minimum or maximum) time between the PSSCH transmission time and the PSFCH transmission time may be different, and in this case, the UE may configure/set each HARQ-related set corresponding to the (minimum or maximum) time between each PSSCH transmission time and each PSFCH transmission time.

For example, for a plurality of HARQ-related sets configured in one resource pool, one or more partial slots may be configured to overlap. Specifically, for example, the one or more partial slots may be included in a first HARQ-related set among the plurality of HARQ-related sets, and may also be included in a second HARQ-related set different from the first HARQ-related set. Alternatively, for example, for a plurality of HARQ related-sets configured in one resource pool, any slot may be configured not to overlap. Specifically, for example, slots included in a specific HARQ-related set among the plurality of HARQ-related sets may not be included in the remaining HARQ related-sets except for the specific HARQ-related set.

For example, the PSFCH resource set or the index_offset value may be configured or determined differently for each HARQ-related set. That is, PSFCH resource sets may be distinguished from each other for each HARQ-related set. Herein, for example, the size of a HARQ codebook (or HARQ-ACK codebook) and/or the PSFCH format may be configured or determined differently for each HARQ-related set. In this case, for example, if a receiving UE transmits HARQ feedback (e.g., ACK, NACK or discontinuous transmission (DTX)) for each of a plurality of PSSCHs and/or PSCCHs received from transmitting UE(s) based on PSFCH resource(s), a combination of HARQ feedback for each of the PSSCHs and/or the PSCCHs may be included in the configured/determined HARQ codebook (or HARQ-ACK codebook). In addition, for example, if the receiving UE transmits HARQ feedback (e.g., ACK, NACK or DTX) for each of a plurality of transport blocks (TBs) or code block groups (CBGs) received from transmitting UE(s) based on PSFCH resource(s), the receiving UE may transmit a HARQ codebook (or HARQ-ACK codebook) including a plurality of HARQ feedback related information. Specifically, for example, in a situation in which PSFCH resources are insufficient, the UE may preferentially allocate the PSFCH resource set to the HARQ-related set corresponding to a value in which the (minimum or maximum) time between the PSSCH transmission time and the PSFCH transmission time is relatively small.

For example, the UE may share the PSFCH resource set with respect to the union of slots included in a plurality of HARQ-related sets. Herein, for example, if a specific slot exists in common in a plurality of HARQ-related sets or if a specific slot is commonly included in a plurality of HARQ-related sets, the UE may set or determine the size of a HARQ codebook (or HARQ-ACK codebook) used for HARQ feedback transmission for PSSCH and/or PSCCH transmission in the specific slot, based on the size of a HARQ codebook (or HARQ-ACK codebook) having a large size value among a plurality of HARQ codebooks (or HARQ-ACK codebooks) configured/determined for each of a plurality of HARQ-related sets. For example, if a specific slot exists in common in a plurality of HARQ-related sets or if a specific slot is commonly included in a plurality of HARQ-related sets, the UE may set or determine the size of a HARQ codebook (or HARQ-ACK codebook) used for HARQ feedback transmission for PSSCH and/or PSCCH transmission in the specific slot to/as a larger value among size values of a plurality of HARQ codebooks (or HARQ-ACK codebooks) related to each of a plurality of HARQ-related sets. Alternatively, for example, for the union of slots included in a plurality of HARQ-related sets, the UE may set or determine the size of a HARQ codebook (or HARQ-ACK codebook) used for HARQ feedback transmission for PSSCH and/or PSCCH transmission in slots included in the union identically or commonly.

For example, in the present disclosure, if a (virtual) PSFCH resource index value indicates an RB index, or if a (virtual) PSFCH resource index value is assigned/set/determined to a value corresponding to an RB index, a process of separately setting/determining a cyclic shift value and/or a base sequence value may be additionally required. For example, the cyclic shift value and/or the base sequence value may be set/determined based on a member ID value. In this case, for example, the member ID value may be set to a specific value in unicast and/or groupcast option 1 communication. For example, the specific value may be 0.

Referring back to FIG. 19, in step S1920, the transmitting UE may transmit the PSSCH and/or the PSCCH to the receiving UE.

In step S1930, the transmitting UE may receive HARQ feedback for the PSSCH and/or the PSCCH from the receiving UE through the PSFCH resource.

Figure 22:
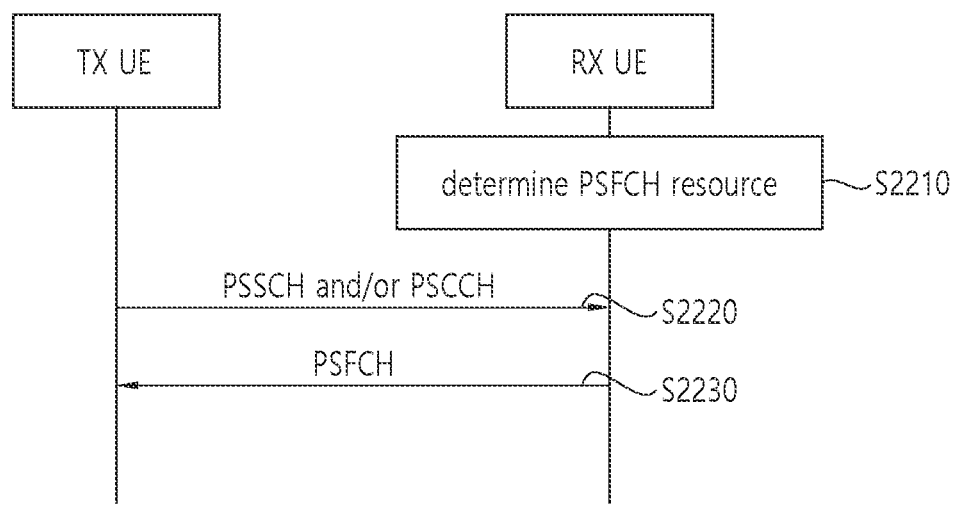
FIG. 22 shows a procedure for a receiving UE to determine PSFCH resource(s), based on an embodiment of the present disclosure.

FIG. 22 shows a procedure for a receiving UE to determine PSFCH resource(s), based on an embodiment of the present disclosure. The embodiment of FIG. 22 may be combined with various embodiments of the present disclosure.

Referring to FIG. 22, in step S2210, the receiving UE may determine/select/allocate a PSFCH resource. For example, the receiving UE may select the PSFCH resource to be used for HARQ feedback, based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method/option, information related to a PSSCH transmitting UE, information related to PSSCH transmission, or information related to a PSSCH receiving UE. A method in which the receiving UE determines the PSFCH resource may be the same as the method in which the transmitting UE determines the PSFCH resource.

In step S2220, the receiving UE may receive the PSSCH and/or the PSCCH from the transmitting UE.

In step S2230, the receiving UE may transmit HARQ feedback for the PSSCH and/or the PSCCH to the transmitting UE through the PSFCH resource.

Based on various embodiments of the present disclosure, the UE/base station may select/allocate the PSFCH resource. For example, the UE may determine a member ID based on a cast type and/or a HARQ feedback transmission method, and the UE may select/determine/allocate the PSFCH resource based on the member ID. Accordingly, an effect of efficiently supporting the HARQ operation may occur.

Figure 23:
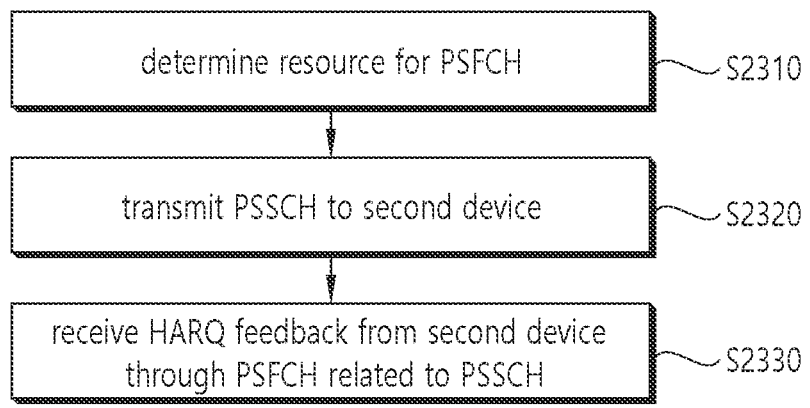
FIG. 23 shows a method for a first device to determine a resource for receiving HARQ feedback, based on an embodiment of the present disclosure.

FIG. 23 shows a method for a first device to determine a resource for receiving HARQ feedback, based on an embodiment of the present disclosure. The embodiment of FIG. 23 may be combined with various embodiments of the present disclosure. In the embodiment of FIG. 23, the order of each step may be changed.

Referring to FIG. 23, in step S2310, the first device may determine a resource for a PSFCH. For example, the resource for the PSFCH may be determined based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method/option, information related to a PSSCH transmitting UE, information related to PSSCH transmission, or information related to a PSSCH receiving UE. The first device may determine the resource for the PSFCH based on various embodiments proposed in the present disclosure.

In step S2320, the first device may transmit a PSSCH to a second device. In step S2330, the first device may receive HARQ feedback from the second device through the PSFCH related to the PSSCH.

The proposed method can be applied to the device(s) described below. First, the processor 102 of the first device 100 may determine a resource for a PSFCH. In addition, the processor 102 of the first device 100 may control the transceiver 106 to transmit a PSSCH to the second device 200. In addition, the processor 102 of the first device 100 may control the transceiver 106 to receive HARQ feedback from the second device 200 through the PSFCH related to the PSSCH.

Figure 24:
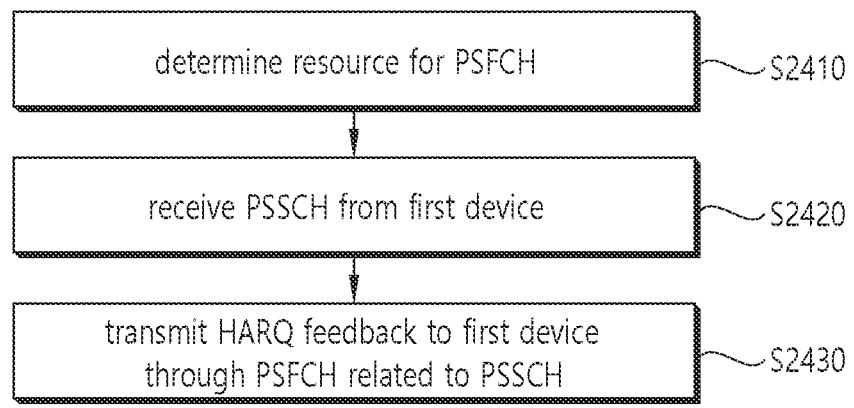
FIG. 24 shows a method for a second device to determine a resource for transmitting HARQ feedback, based on an embodiment of the present disclosure.

FIG. 24 shows a method for a second device to determine a resource for transmitting HARQ feedback, based on an embodiment of the present disclosure. The embodiment of FIG. 24 may be combined with various embodiments of the present disclosure. In the embodiment of FIG. 24, the order of each step may be changed.

Referring to FIG. 24, in step S2410, the second device may determine a resource for a PSFCH. For example, the resource for PSFCH may be determined based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method/option, information related to a PSSCH transmitting UE, information related to PSSCH transmission, or information related to a PSSCH receiving UE. The second device may determine the resource for the PSFCH based on various embodiments proposed in the present disclosure.

In step S2420, the second device may receive a PSSCH from a first device. In step S2430, the second device may transmit HARQ feedback to the first device through the PSFCH related to the PSSCH.

The proposed method can be applied to the device(s) described below. First, the processor 202 of the second device 200 may determine a resource for a PSFCH. In addition, the processor 202 of the second device 200 may control the transceiver 206 to receive a PSSCH from the first device 100. In addition, the processor 202 of the second device 200 may control the transceiver 206 to transmit HARQ feedback to the first device 100 through the PSFCH related to the PSSCH.

Figure 25:
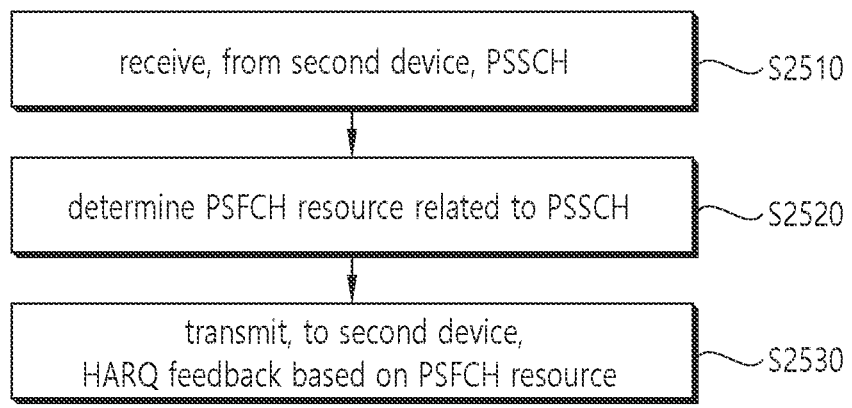
FIG. 25 shows a method for a first device to perform wireless communication, based on an embodiment of the present disclosure.

FIG. 25 shows a method for a first device to perform wireless communication, based on an embodiment of the present disclosure. The embodiment of FIG. 25 may be combined with various embodiments of the present disclosure.

Referring to FIG. 25, in step S2510, the first device may receive, from a second device, a physical sidelink shared channel (PSSCH). In step S2520, the first device may determine a physical sidelink feedback channel (PSFCH) resource related to the PSSCH. In step S2530, the first device may transmit, to the second device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

For example, based on Table 5, the first device may determine one or more PRBs for PSFCH transmission corresponding to the PSSCH received on the i-th slot and the j-th subchannel.

TABLE 5

A UE is provided by rbSetPSFCH a set of $M_{PRB,\ set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ PSSCH slots associated with a PSFCH slot, provided by periodPSFCHresource, the UE allocates the $[(i + j \cdot N_{PSSCH}^{PSFCH}) \cdot M_{subch,\ slot}^{PSFCH}, (i + 1 + j \cdot N_{PSSCH}^{PSFCH}) \cdot M_{subch,\ slot}^{PSFCH} - 1]$ PRBs from the $M_{PRB,\ set}^{PSFCH}$ PRBs to slot i and sub-channel j, where $M_{subch,\ slot}^{PSFCH} = M_{PRB,\ set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,\ set}^{PSFCH}$ is a multiple of $N_{subch} \cdot N_{PSSCH}^{PSFCH}$.

In addition, based on Table 6, the first device may determine the number of available PSFCH resources.

TABLE 6

A UE determines a number of PSFCH resources available for multiplexing HARQ-ACK information in a PSFCH transmission as $R_{PRB,\ CS}^{PSFCH} = N_{type}^{PSFCH} \cdot M_{subch,\ slot}^{PSFCH} \cdot N_{CS}^{PSFCH}$ where $N_{CS}^{PSFCH}$ is a number of cyclic shift pairs for the resource pool and, based on an indication by higher layers,
$N_{type}^{PSFCH} = 1$ and the $M_{subch,\ slot}^{PSFCH}$ PRBs are associated with the starting sub-channel of the corresponding PSSCH
$N_{type}^{PSFCH} = N_{subch}^{PSSCH}$ and the $N_{subch}^{PSSCH} \cdot M_{subch,\ slot}^{PSFCH}$ PRBs are associated with one or more sub-channels from $N_{subch}^{PSSCH}$ sub-channels of the corresponding PSSCH
The PSFCH resources are first indexed according to an ascending order of the PRB index, from the $N_{type}^{PSFCH} \cdot M_{subch,\ slot}^{PSFCH}$ PRBs, and then according to an ascending order of the cyclic shift pair index from the $N_{CS}^{PSFCH}$ cyclic shift pairs.

In addition, the first device may determine an index of the PSFCH resource based on Table 7. In addition, the first device may transmit HARQ feedback on the PSFCH resource corresponding to the index. Additionally, if the index is related to a specific cyclic shift, the first device may transmit HARQ feedback to which the specific cyclic shift is applied, based on the PSFCH resource corresponding to the index.

TABLE 7

A UE determines an index of a PSFCH resource for a PSFCH transmission in response to a PSSCH reception, as $(P_{ID} + M_{ID})\bmod R_{PRB,\ CS}^{PSFCH}$ where $P_{ID}$ is a physical layer source ID provided by SCI format 0_2 scheduling the PSSCH reception, $M_{ID}$ is zero or $M_{ID}$ is the identity of the UE receiving the PSSCH as indicated by higher layers.

For example, the ID of the first device may be determined based on the cast type of communication between the first device and the second device.

For example, the ID of the first device may be determined to be zero, based on the cast type being unicast.

For example, the ID of the first device may be determined to be a non-zero value, based on the cast type being groupcast based on a second option. For example, in the groupcast based on the second option, the HARQ feedback may be HARQ ACK based on successful decoding of data on the PSSCH by the first device, and the HARQ feedback may be HARQ NACK based on failure of decoding of data on the PSSCH by the first device. For example, the ID of the first device may be an ID allocated by a higher layer.

For example, the ID of the first device may be determined to be zero, based on the cast type being groupcast based on a first option. For example, in the groupcast based on the first option, the HARQ feedback may be HARQ NACK based on failure of decoding of data on the PSSCH by the first device, and the HARQ feedback may not be transmitted based on successful decoding of data on the PSSCH by the first device.

For example, the PSFCH resource may be determined, among at least one PSFCH resource determined based on the sub-channel related to the PSSCH and the slot related to the PSSCH, based on the ID of the first device related to the cast type and the source ID of the second device.

Additionally, for example, the first device may determine information related to a cyclic shift applied to the HARQ feedback on the PSFCH resource. For example, the information related to the cyclic shift applied to the HARQ feedback on the PSFCH resource may be determined based on the ID of the first device. For example, the HARQ feedback may be transmitted to the second device on the PSFCH resource based on the information related to the cyclic shift.

For example, the PSFCH resource may include at least one of a time domain resource, a frequency domain resource, and a code domain resource.

Additionally, for example, the first device may receive, from the second device, the source ID of the second device through a sidelink control information (SCI).

The proposed method can be applied to the device(s) described below. First, the processor 102 of the first device 100 may control the transceiver 106 to receive, from a second device, a physical sidelink shared channel (PSSCH). In addition, the processor 102 of the first device 100 may determine a physical sidelink feedback channel (PSFCH) resource related to the PSSCH. In addition, the processor 102 of the first device 100 may control the transceiver 106 to transmit, to the second device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a physical sidelink shared channel (PSSCH); determine a physical sidelink feedback channel (PSFCH) resource related to the PSSCH; and transmit, to the second device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE, a physical sidelink shared channel (PSSCH); determine a physical sidelink feedback channel (PSFCH) resource related to the PSSCH; and transmit, to the second UE, a hybrid automatic repeat request (HARQ) feedback based on the PSFCH resource. For example, the PSFCH resource may be determined based on a sub-channel related to the PSSCH, a slot related to the PSSCH, a cast type of communication between the first UE and the second UE, an ID of the first UE, and a source ID of the second UE.

Based on an embodiment of the present disclosure, a non-transitory computer-readable storage medium storing instructions may be provided. For example, the instructions, when executed, may cause a first device to: receive, from a second device, a physical sidelink shared channel (PSSCH); determine a physical sidelink feedback channel (PSFCH) resource related to the PSSCH; and transmit, to the second device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Figure 26:
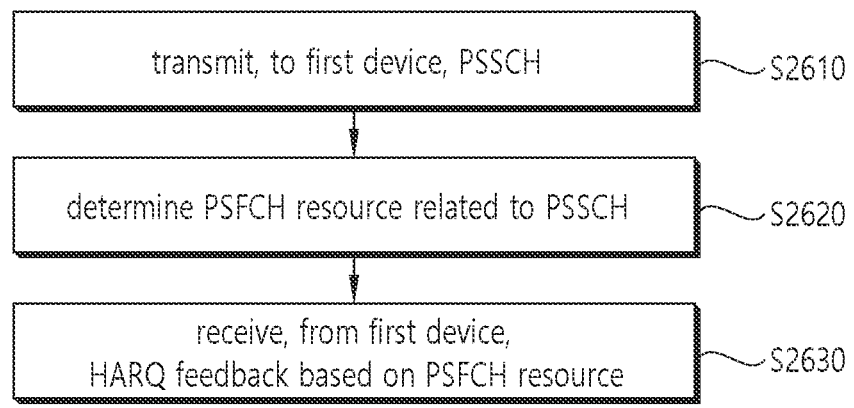
FIG. 26 shows a method for a second device to perform wireless communication, based on an embodiment of the present disclosure.

FIG. 26 shows a method for a second device to perform wireless communication, based on an embodiment of the present disclosure. The embodiment of FIG. 26 may be combined with various embodiments of the present disclosure.

Referring to FIG. 26, in step S2610, the second device may transmit, to a first device, a physical sidelink shared channel (PSSCH). In step S2620, the second device may determine a physical sidelink feedback channel (PSFCH) resource related to the PSSCH. In step S2630, the second device may receive, from the first device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

For example, based on Table 5, the second device may determine one or more PRBs for PSFCH reception corresponding to the PSSCH transmitted on the i-th slot and the j-th subchannel. In addition, based on Table 6, the second device may determine the number of available PSFCH resources. In addition, the second device may determine an index of the PSFCH resource based on Table 7. In addition, the second device may receive HARQ feedback on the PSFCH resource corresponding to the index. Additionally, if the index is related to a specific cyclic shift, the second device may receive HARQ feedback to which the specific cyclic shift is applied, based on the PSFCH resource corresponding to the index.

The proposed method can be applied to device(s) described below. First, the processor 202 of the second device 200 may control the transceiver 206 to transmit, to a first device, a physical sidelink shared channel (PSSCH). In addition, the processor 202 of the second device 200 may determine a physical sidelink feedback channel (PSFCH) resource related to the PSSCH. In addition, the processor 202 of the second device 200 may control the transceiver 206 to receive, from the first device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a physical sidelink shared channel (PSSCH); determine a physical sidelink feedback channel (PSFCH) resource related to the PSSCH; and receive, from the first device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: transmit, to a first UE, a physical sidelink shared channel (PSSCH); determine a physical sidelink feedback channel (PSFCH) resource related to the PSSCH; and receive, from the first UE, a hybrid automatic repeat request (HARQ) feedback based on the PSFCH resource. For example, the PSFCH resource may be determined based on a sub-channel related to the PSSCH, a slot related to the PSSCH, a cast type of communication between the first UE and the second UE, an ID of the first UE, and a source ID of the second UE.

Based on an embodiment of the present disclosure, a non-transitory computer-readable storage medium storing instructions may be provided. For example, the instructions, when executed, may cause a second device to: transmit, to a first device, a physical sidelink shared channel (PSSCH); determine a physical sidelink feedback channel (PSFCH) resource related to the PSSCH; and receive, from the first device, a hybrid automatic repeat request (HARQ) feedback based on the PSFCH resource. For example, the PSFCH resource may be determined based on a sub-channel related to the PSSCH, a slot related to the PSSCH, a cast type of communication between the first device and the second device, an ID of the first device, and a source ID of the second device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 27:
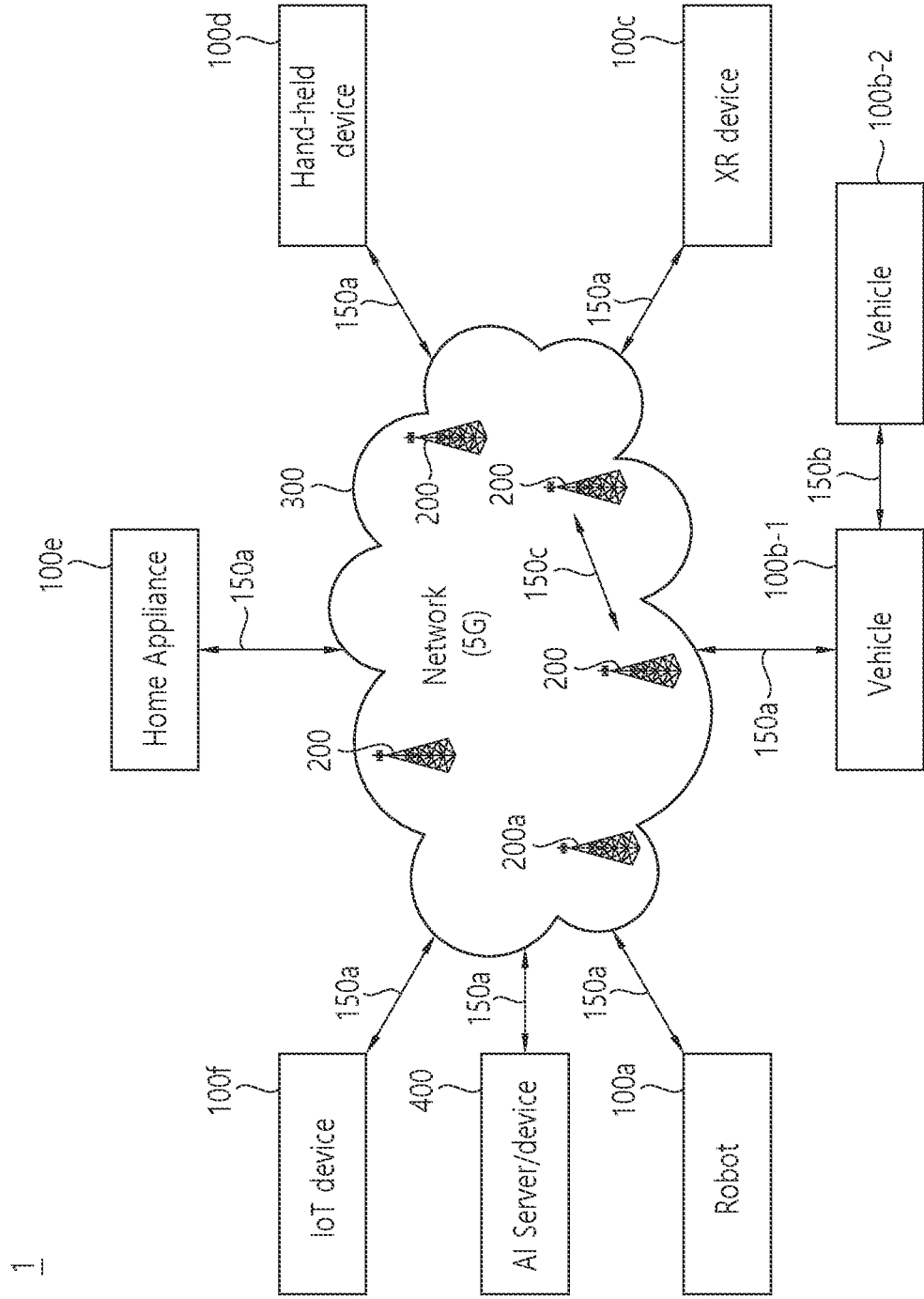
FIG. 27 shows a communication system 1, based on an embodiment of the present disclosure.

FIG. 27 shows a communication system 1, based on an embodiment of the present disclosure.

Referring to FIG. 27, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 28:
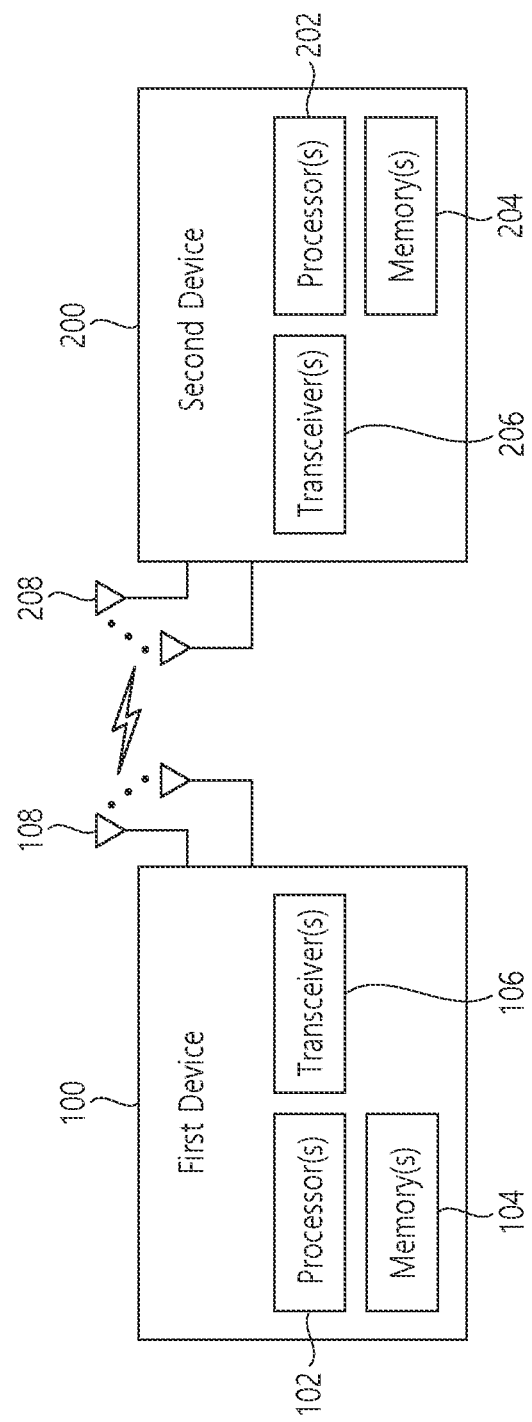
FIG. 28 shows wireless devices, based on an embodiment of the present disclosure.

FIG. 28 shows wireless devices, based on an embodiment of the present disclosure.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s)206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY. MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 29:
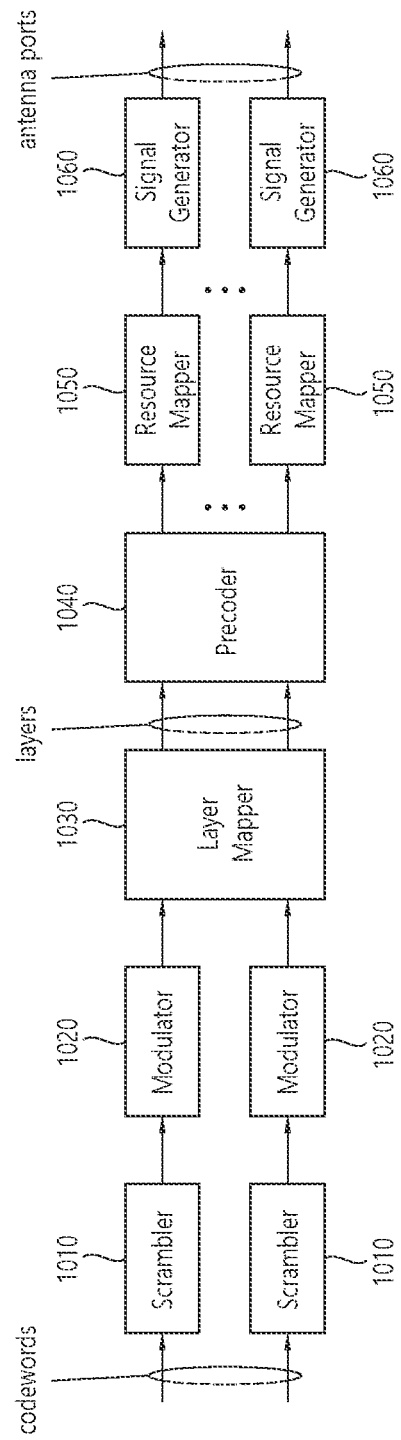
FIG. 29 shows a signal process circuit for a transmission signal, based on an embodiment of the present disclosure.

FIG. 29 shows a signal process circuit for a transmission signal, based on an embodiment of the present disclosure.

Referring to FIG. 29, a signal processing circuit 1000 may include scramblers 1010, modulators 1020, a layer mapper 1030, a precoder 1040, resource mappers 1050, and signal generators 1060. An operation/function of FIG. 29 may be performed, without being limited to, the processors 102 and 202 and/or the transceivers 106 and 206 of FIG. 28. Hardware elements of FIG. 29 may be implemented by the processors 102 and 202 and/or the transceivers 106 and 206 of FIG. 28. For example, blocks 1010 to 1060 may be implemented by the processors 102 and 202 of FIG. 28. Alternatively, the blocks 1010 to 1050 may be implemented by the processors 102 and 202 of FIG. 28 and the block 1060 may be implemented by the transceivers 106 and 206 of FIG. 28.

Codewords may be converted into radio signals via the signal processing circuit 1000 of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 29. For example, the wireless devices (e.g., 100 and 200 of FIG. 28) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 30:
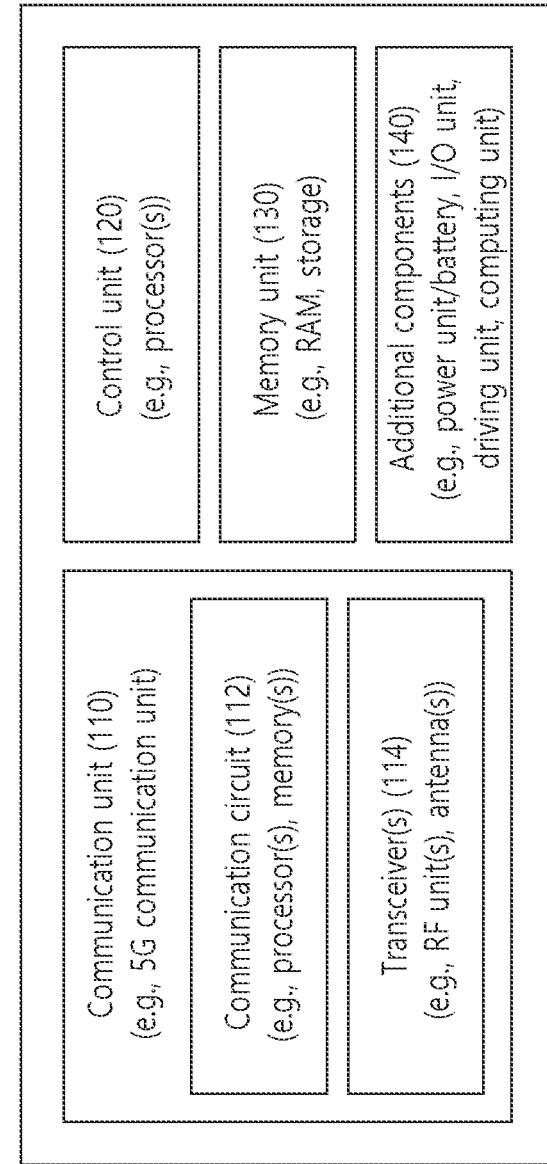
FIG. 30 shows another example of a wireless device, based on an embodiment of the present disclosure.

FIG. 30 shows another example of a wireless device, based on an embodiment of the present disclosure. The wireless device may be implemented in various forms according to a use-case/service (refer to FIG. 27).

Referring to FIG. 30, wireless devices 100 and 200 may correspond to the wireless devices 100 and 200 of FIG. 28 and may be configured by various elements, components, units/portions, and/or modules. For example, each of the wireless devices 10 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
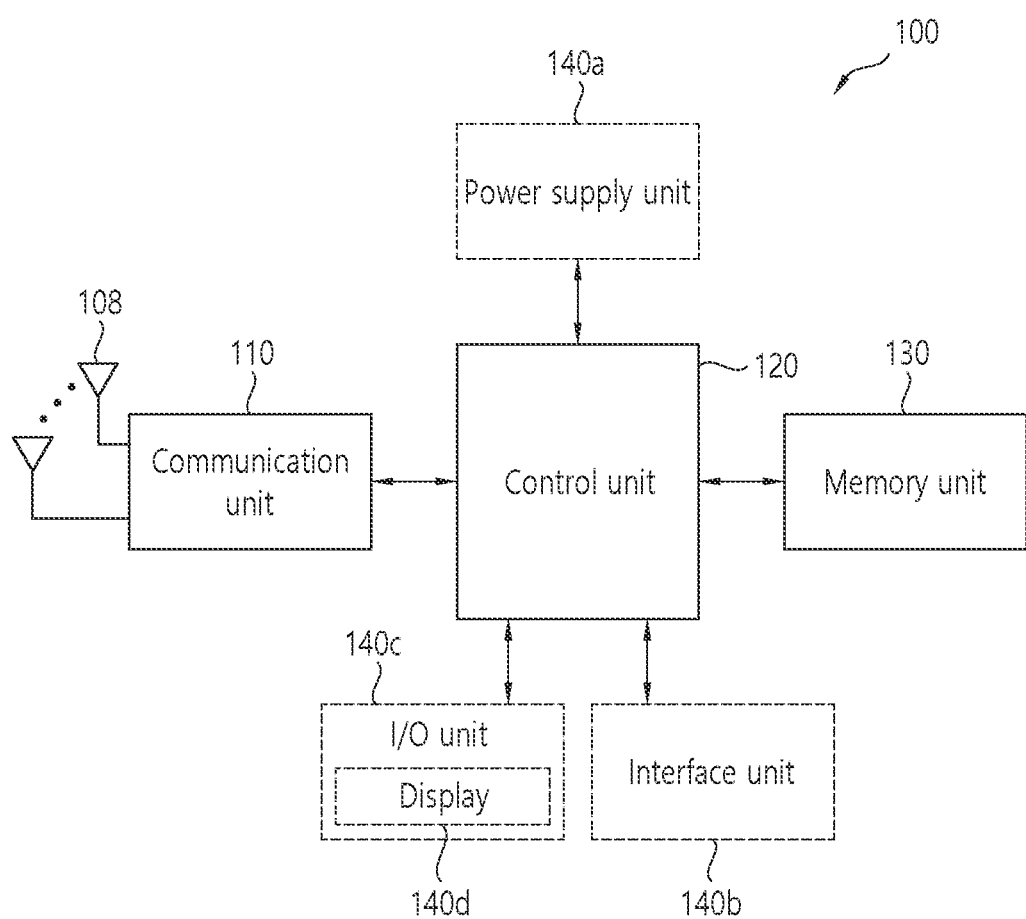
FIG. 31 shows a hand-held device, based on an embodiment of the present disclosure.

FIG. 31 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 30, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 32:
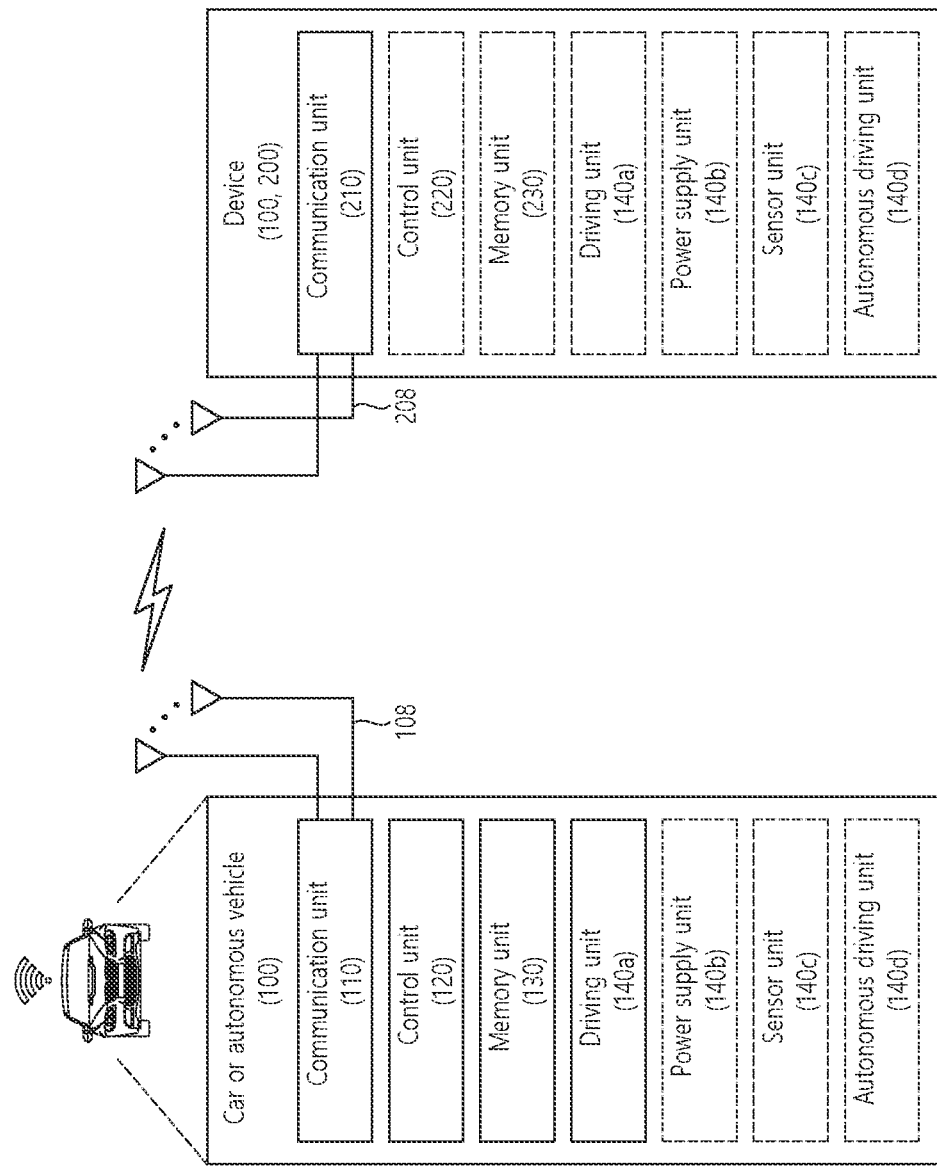
FIG. 32 shows a vehicle or an autonomous vehicle, based on an embodiment of the present disclosure.

FIG. 32 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 32, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 30, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining a set of physical resource blocks (PRBs) for physical sidelink feedback channel (PSFCH) transmission;

receiving, from a second device, a physical sidelink shared channel (PSSCH);

allocating at least one PRB to a sub-channel and a slot related to the PSSCH; and determining an index of a PSFCH resource for PSFCH transmission, among the at least one PRB, in response to the reception of the PSSCH, based on an identifier (ID) of the first device and a source ID of the second device, wherein, based on a cast type related to the PSSCH which is unicast or negative acknowledgement-only based groupcast, the ID of the first device is zero, and wherein, based on the cast type related to the PSSCH which is positive-negative acknowledgement based groupcast, the ID of the first device is an ID for identifying the first device among devices performing groupcast communication within a group.

2. The method of claim 1, wherein only negative acknowledgement transmission is allowed in the negative acknowledgement-only based groupcast.

3. The method of claim 1, wherein, based on the cast type related to the PSSCH which is the positive-negative acknowledgement based groupcast, the ID of the first device for determining the index of the PSFCH resource is an ID allocated by a higher layer.

4. The method of claim 1, wherein positive acknowledgement transmission or negative acknowledgement transmission is allowed in the positive-negative acknowledgement based groupcast.

5. The method of claim 1, further comprising:

transmitting, to the second device, hybrid automatic repeat request (HARQ) feedback based on the PSFCH resource.

6. The method of claim 5, wherein, in the negative acknowledgement-only based groupcast, the HARQ feedback includes negative acknowledgement based on failure of decoding of data on the PSSCH by the first device.

7. The method of claim 5, wherein, in the negative acknowledgement-only based groupcast, the transmission of the HARQ feedback is skipped based on successful decoding of data on the PSSCH by the first device.

8. The method of claim 5, further comprising:

determining information related to a cyclic shift applied to the HARQ feedback on the PSFCH resource.

9. The method of claim 8, wherein the information related to the cyclic shift applied to the HARQ feedback on the PSFCH resource is determined based on the ID of the first device.

10. The method of claim 8, wherein the HARQ feedback is transmitted to the second device on the PSFCH resource based on the information related to the cyclic shift.

11. The method of claim 1, wherein the source ID of the second device is included in a sidelink control information (SCI) received through the PSSCH.

12. A first device adapted to perform wireless communication, the first device comprising:

one or more transceivers;
one or more processors; and
one or more memories operably connected to the one or more processors and storing instructions that, when executed by the one or more processors, perform operations comprising:

obtaining a set of physical resource blocks (PRBs) for physical sidelink feedback channel (PSFCH) transmission;

receiving, from a second device, a physical sidelink shared channel (PSSCH);

allocating at least one PRB to a sub-channel and a slot related to the PSSCH; and determining an index of a PSFCH resource for PSFCH transmission, among the at least one PRB, in response to the reception of the PSSCH, based on an identifier (ID) of the first device and a source ID of the second device, wherein, based on a cast type related to the PSSCH which is unicast or negative acknowledgement-only based groupcast, the ID of the first device is zero, and wherein, based on the cast type related to the PSSCH which is positive-negative acknowledgement based groupcast the ID of the first device is an ID for identifying the first device among devices performing groupcast communication within a group.

13. The first device of claim 12, wherein only negative acknowledgement transmission is allowed in the negative acknowledgement-only based groupcast.

14. The first device of claim 12, wherein, based on the cast type related to the PSSCH which is the positive-negative acknowledgement based groupcast, the ID of the first device for determining the index of the PSFCH resource is an ID allocated by a higher layer.

15. A processing device adapted to control a first device, the processing device comprising:

one or more processors; and
one or more memories operably connected to the one or more processors and storing instructions that, when executed by the one or more processors, perform operations comprising:

obtaining a set of physical resource blocks (PRBs) for physical sidelink feedback channel (PSFCH) transmission;

receiving, from a second device, a physical sidelink shared channel (PSSCH);

allocating at least one PRB to a sub-channel and a slot related to the PSSCH; and determining an index of a PSFCH resource for PSFCH transmission, among the at least one PRB, in response to the reception of the PSSCH, based on an identifier (ID) of the first device and a source ID of the second device, wherein, based on a cast type related to the PSSCH which is unicast or negative acknowledgement-only based groupcast, the ID of the first device is zero, and wherein, based on the cast type related to the PSSCH which is positive-negative acknowledgement based groupcast, the ID of the first device is an ID for identifying the first device among devices performing groupcast communication within a group.

16. The processing device of claim 15, wherein only negative acknowledgement transmission is allowed in the negative acknowledgement-only based groupcast.

17. The processing device of claim 15, wherein, based on the cast type related to the PSSCH which is the positive-negative acknowledgement based groupcast, the ID of the first device for determining the index of the PSFCH resource is an ID allocated by a higher layer.

* * * * *